(12) United States Patent
Mizuguchi et al.

(10) Patent No.: US 8,364,038 B2
(45) Date of Patent: Jan. 29, 2013

(54) POLARIZATION MULTIPLEXED OPTICAL TRANSMITTER AND METHOD FOR CONTROLLING POLARIZATION MULTIPLEXED OPTICAL SIGNAL

(75) Inventors: Noriaki Mizuguchi, Kawasaki (JP); Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 359 days.

(21) Appl. No.: 12/854,289

(22) Filed: Aug. 11, 2010

(65) Prior Publication Data

US 2011/0044702 A1 Feb. 24, 2011

(30) Foreign Application Priority Data

Aug. 21, 2009 (JP) .................... 2009-191650

(51) Int. Cl.
*H04J 14/06* (2006.01)
*H04B 10/04* (2006.01)
*H04B 10/12* (2006.01)
(52) U.S. Cl. ............................ 398/65; 398/185; 398/198
(58) Field of Classification Search .................... 398/65, 398/185, 198
See application file for complete search history.

(56) References Cited

U.S. PATENT DOCUMENTS

2008/0170864 A1 7/2008 Nishihara et al.
2009/0245795 A1* 10/2009 Joyner et al. .................... 398/79

FOREIGN PATENT DOCUMENTS

JP 2008-172714 7/2008
JP 2009-63835 3/2009

* cited by examiner

*Primary Examiner* — Shi K Li
(74) *Attorney, Agent, or Firm* — Fujitsu Patent Center

(57) ABSTRACT

A polarization multiplexed optical transmitter includes first and second modulation units, combiner, phase controller, and signal controller. The first and second modulation units generate first and second modulated optical signals, respectively. The first and second modulation units include first and second phase shifter to give phase difference between optical paths of corresponding Mach-Zehnder interferometer, respectively. The combiner generates polarization multiplexed optical signal from the first and second modulated optical signals. The phase controller controls the phase difference by the first phase shifter to a target value and the phase difference by the second phase shifter to a value shifted by $\pi$ from the target value. The signal controller controls operation state of at least one of the first and second modulation units based on optical intensity waveform of the polarization multiplexed optical signal.

13 Claims, 45 Drawing Sheets

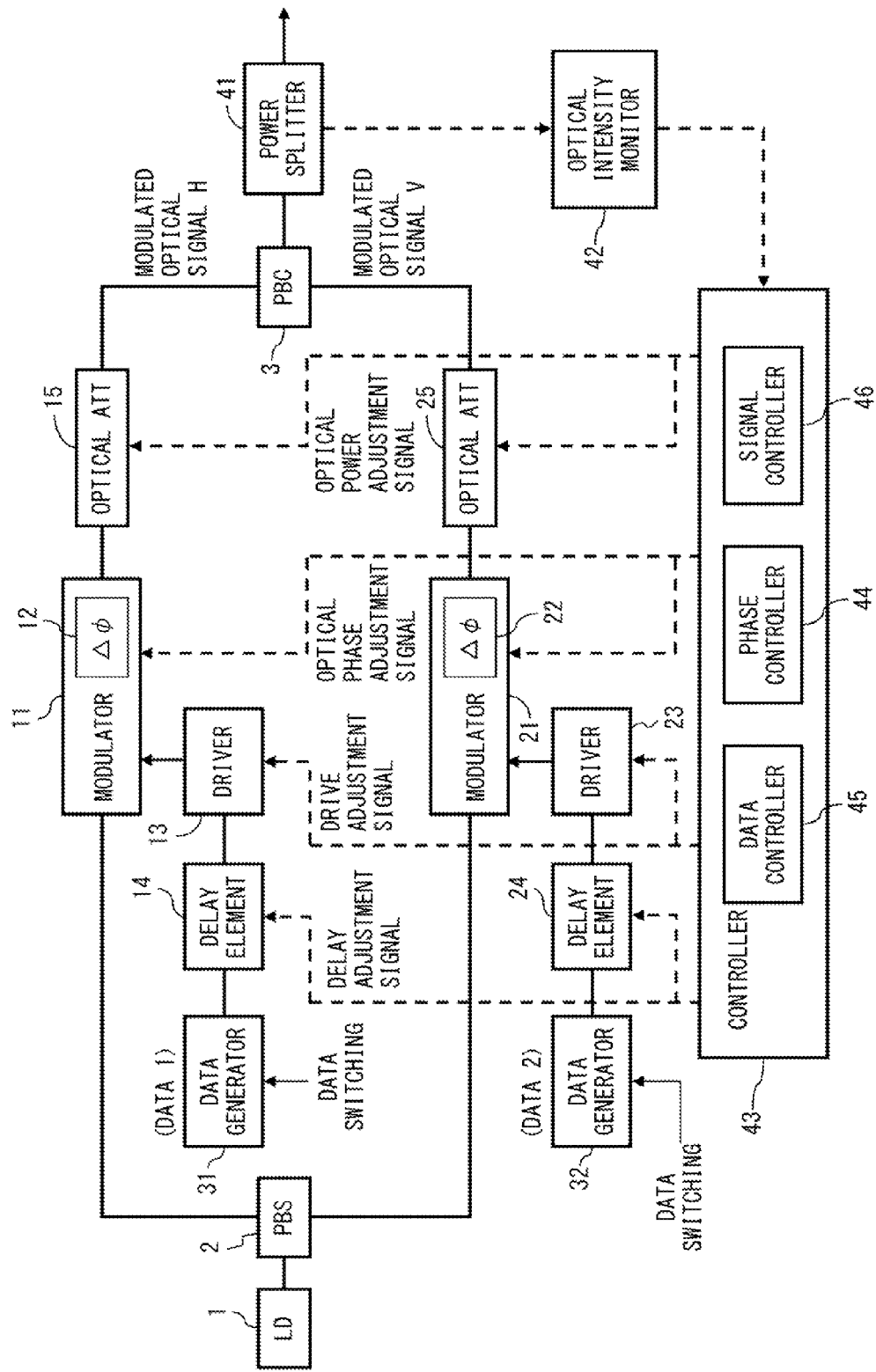
F I G. 2

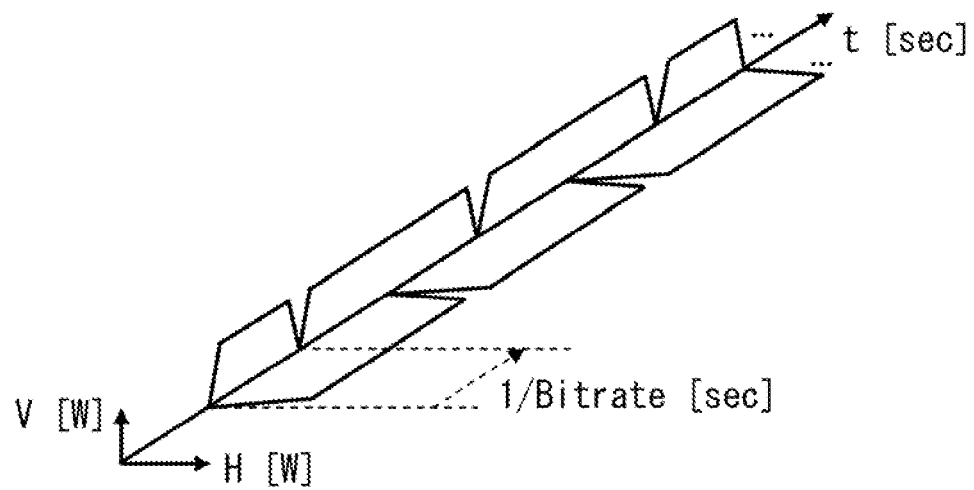
F I G. 8

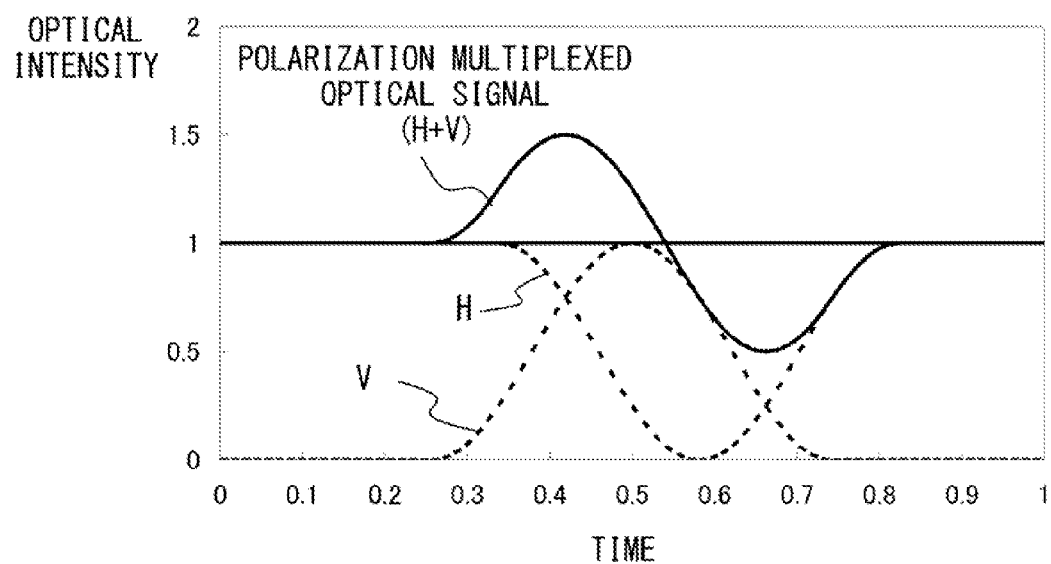
F I G. 10 A

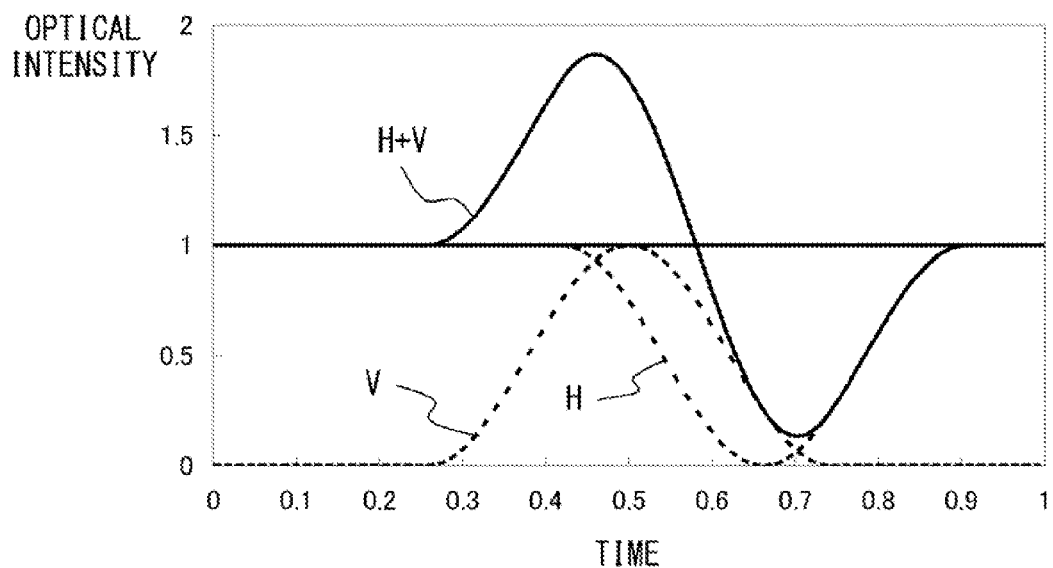
F I G. 10B

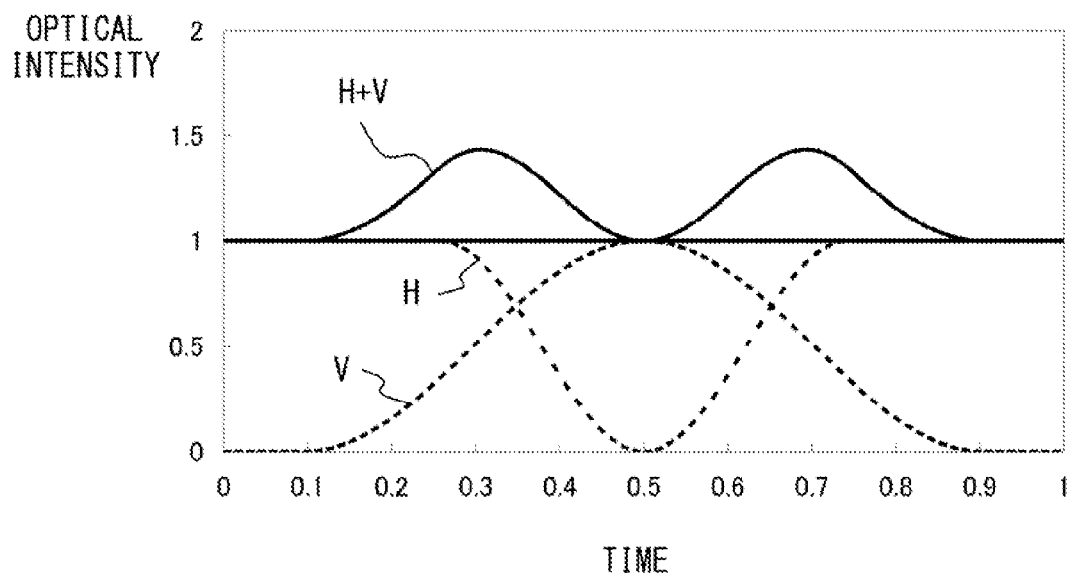
F I G. 1 1 B

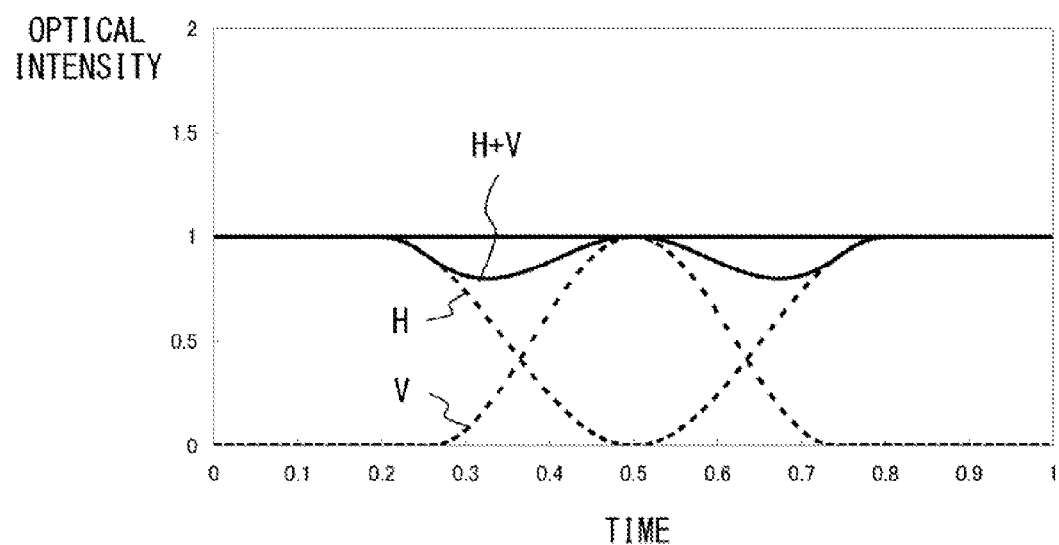
F I G. 1 1 C

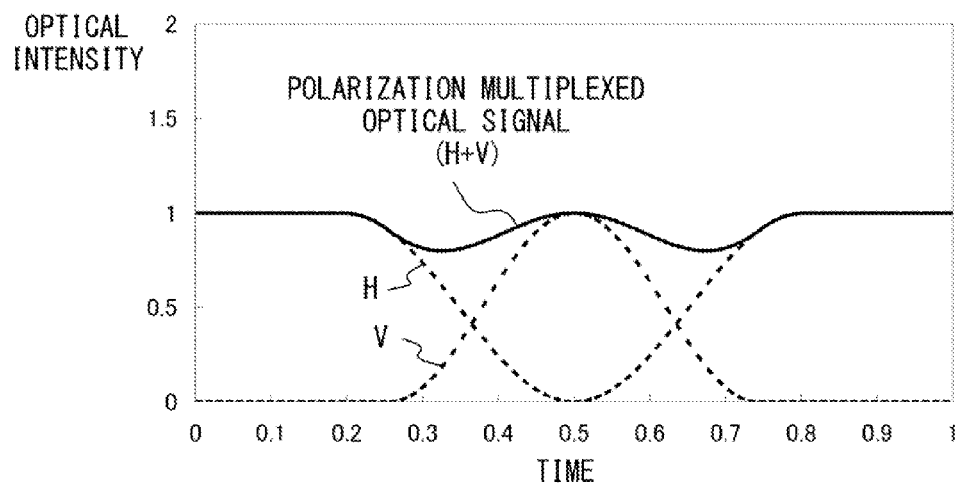
F I G. 14 A
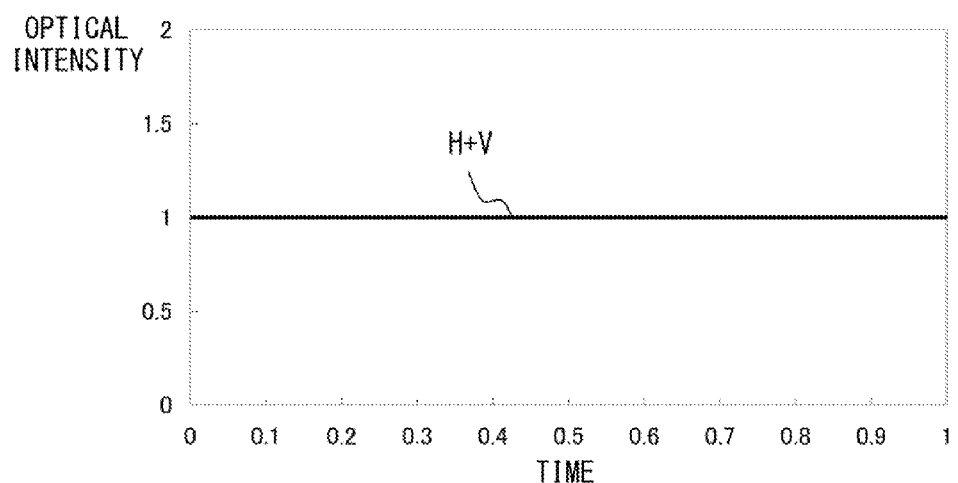
F I G. 14 B

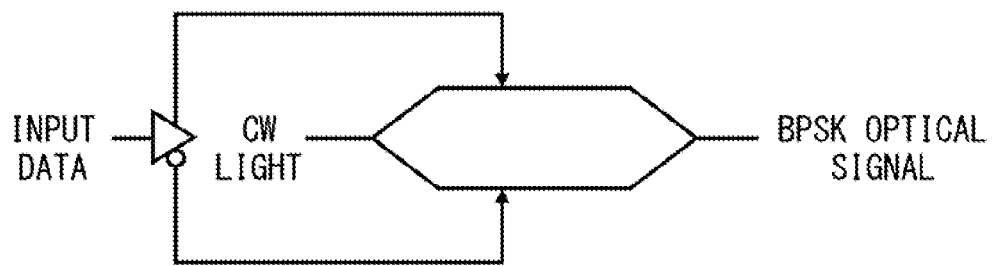
F I G. 15 A
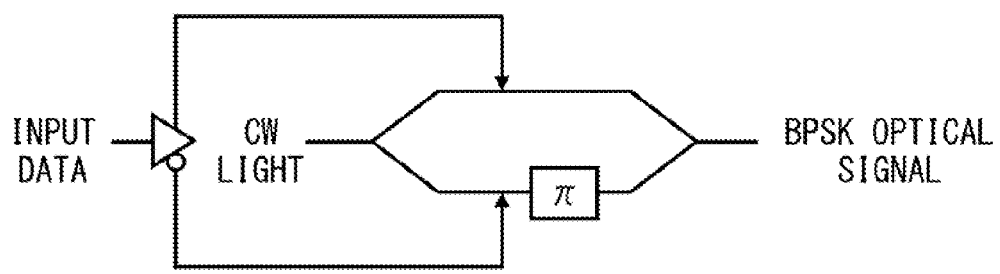
F I G. 15 B

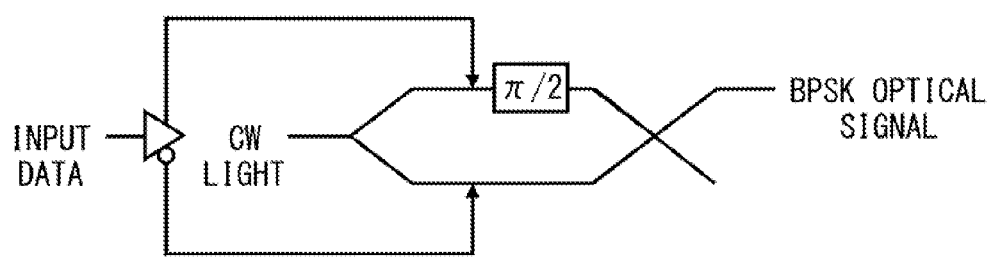
F I G. 1 6 A
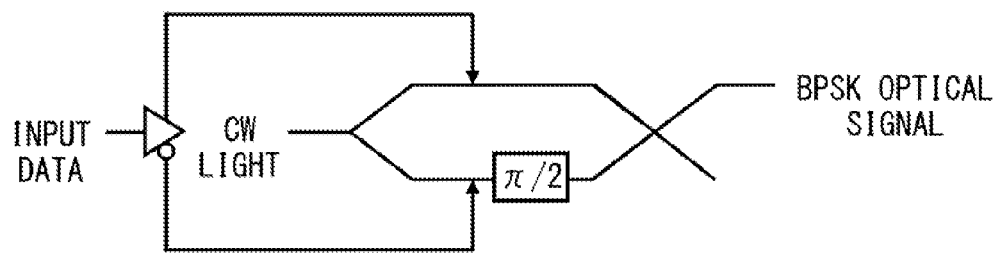
F I G. 1 6 B

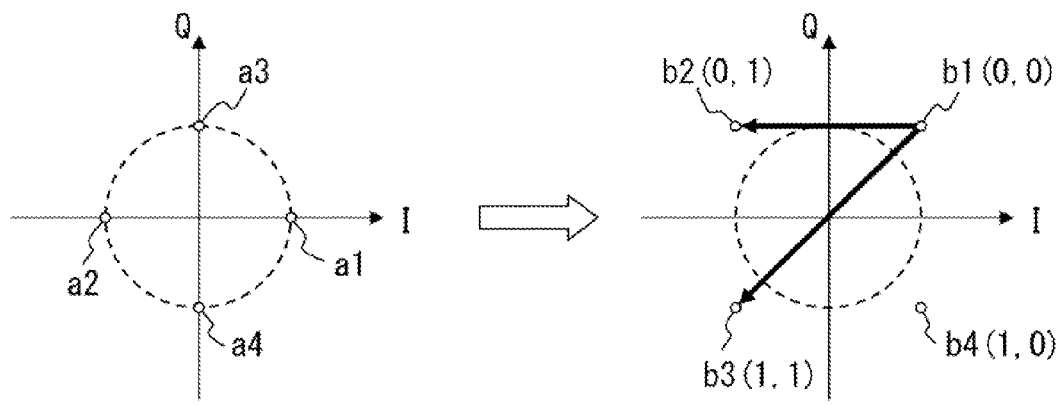
F I G. 1 8 A
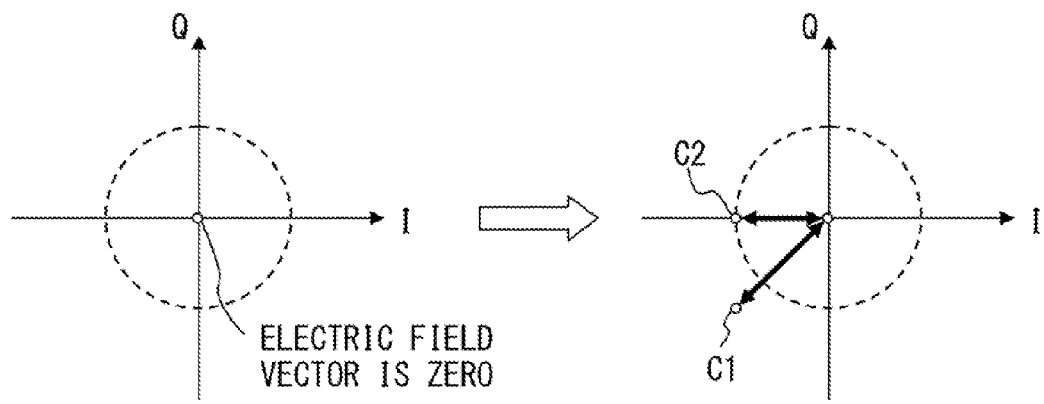
F I G. 1 8 B

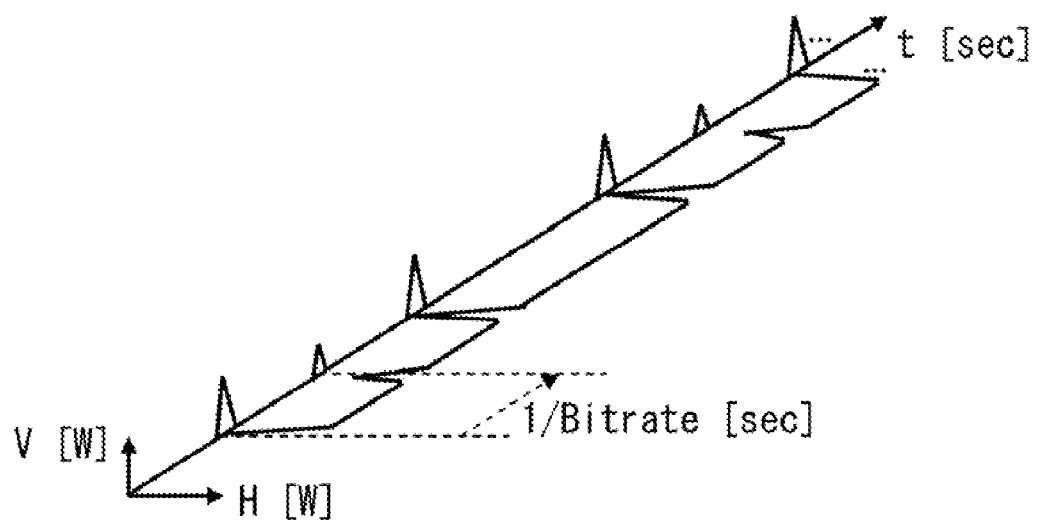
F I G. 19

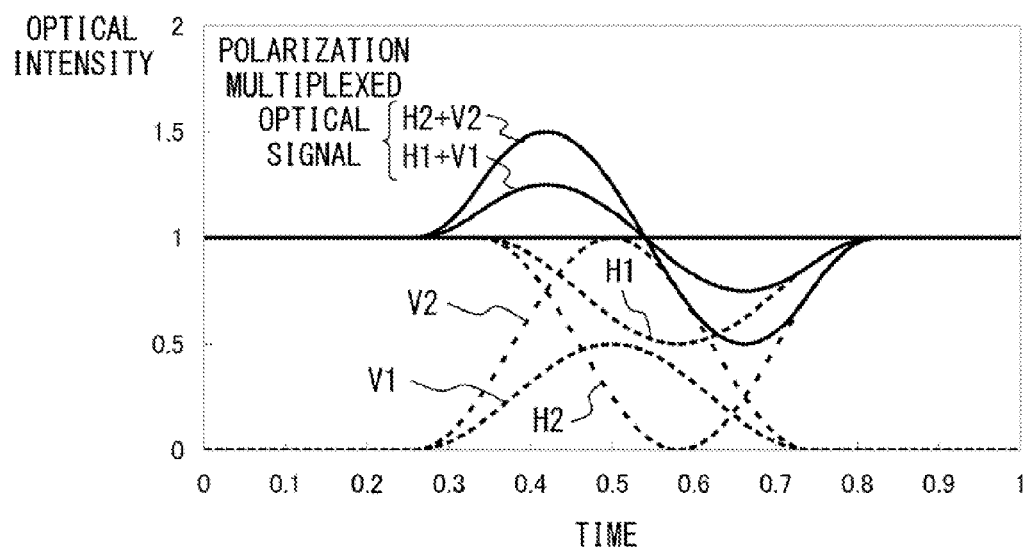
F I G. 2 1 A

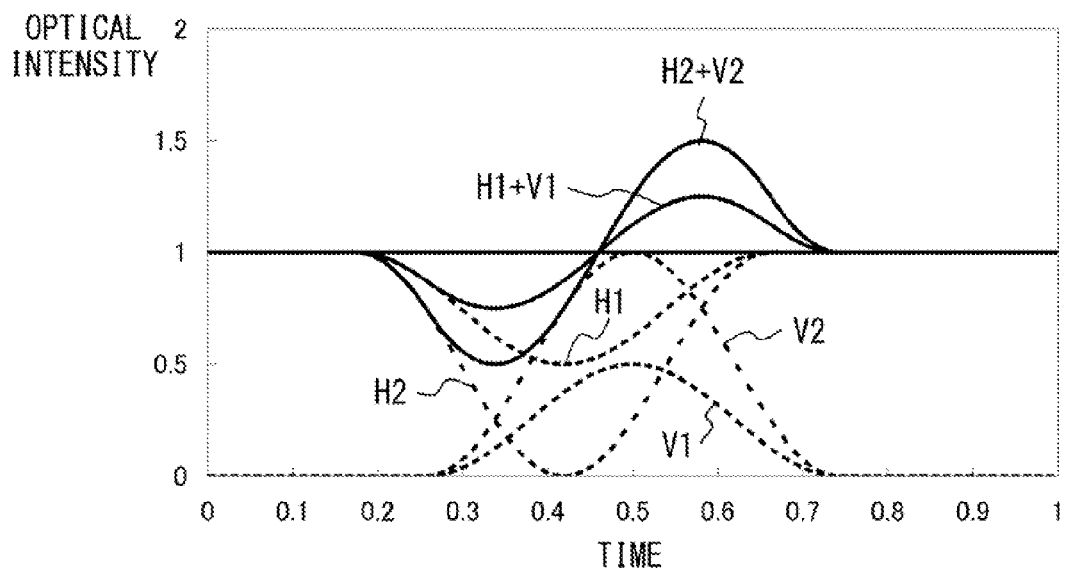
F I G. 2 1 C

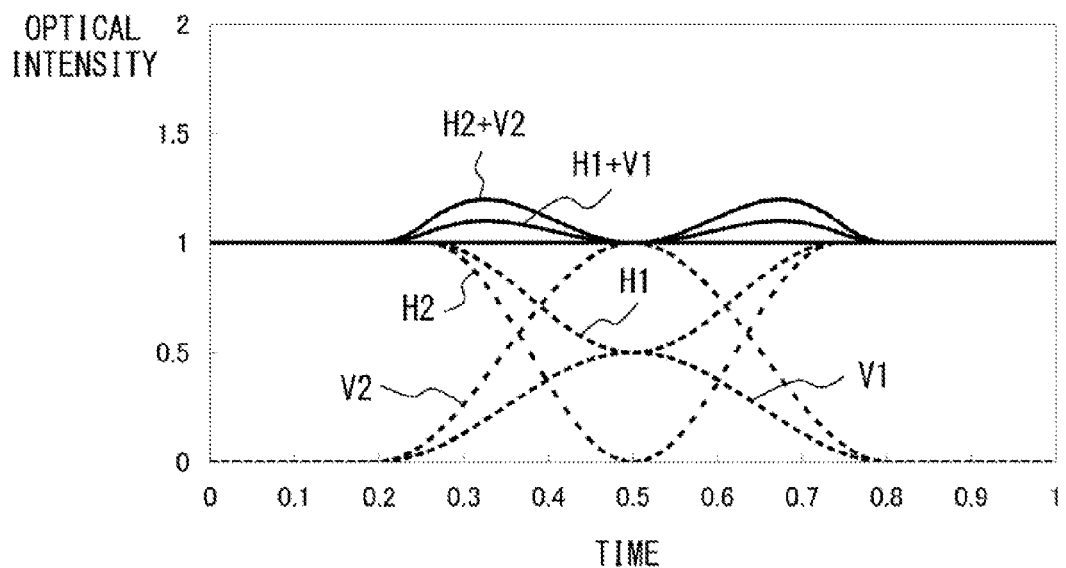
F I G. 2 2 A

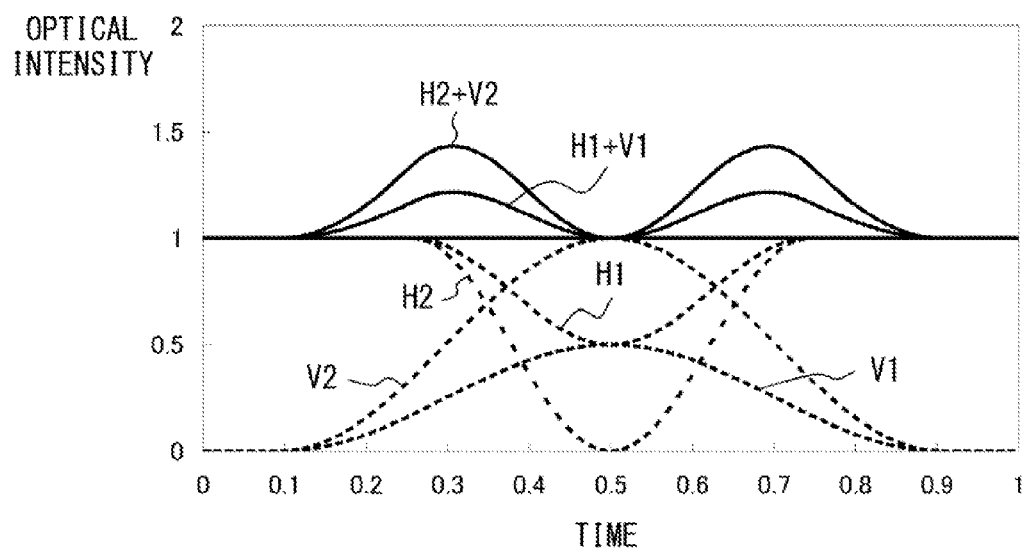
F I G. 2 2 B

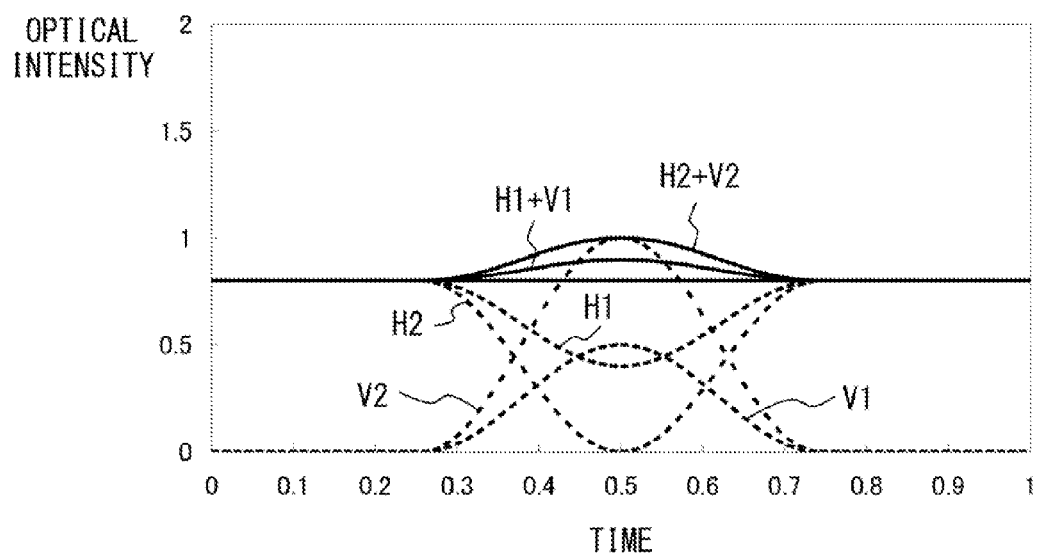
F I G. 2 3 A

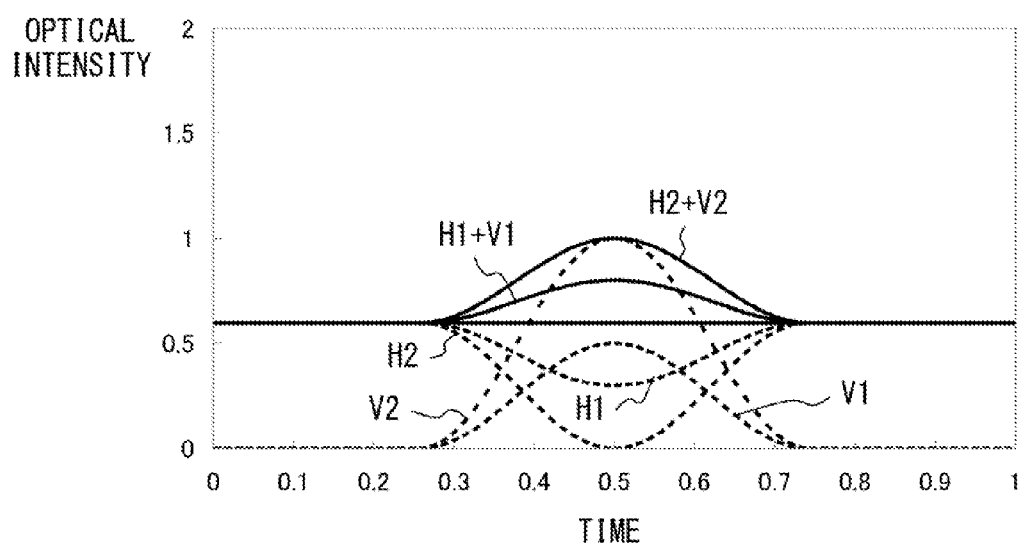
F I G. 23B

POLARIZATION MULTIPLEXED OPTICAL TRANSMITTER AND METHOD FOR CONTROLLING POLARIZATION MULTIPLEXED OPTICAL SIGNAL

CROSS-REFERENCE TO RELATED APPLICATIONS

This application is based upon and claims the benefit of priority of the prior Japanese Patent Application No. 2009-191650, filed on Aug. 21, 2009, the entire contents of which are incorporated herein by reference.

FIELD

The present invention relates a polarization multiplexed optical transmitter and a method for controlling polarization multiplexed optical signal. The invention may be applied to, for example, an optical transmitter used in a polarization multiplexed transmission system.

BACKGROUND

The needs for super high speed transmission systems with a speed of more than 40 Gbit/s (for example, 100 Gbit/s) have been increasing rapidly. For this reason, development is under way for practical realization of an optical transmission system that adopts a multilevel modulation scheme applied to a radio system (for example, the QPSK modulation using four-level phase modulation). However, as the transmission-signal speed becomes higher, solving problems related to the feasibility of the electric signal circuit and problems related to the degradation of the optical transmission signal (transmission-signal spectrum degradation due to an optical filter and signal degradation due to chromatic dispersion and accumulation of optical noises) becomes more difficult.

As one of techniques for solving these problems, optical polarization multiplexing has attracted attention. A polarization multiplexed optical signal is generated by, for example, a polarization multiplexed optical transmitter illustrated in FIG. 1A. The polarization multiplexed optical transmitter has a light source (LD), a pair of modulators, and a polarization beam combiner (PBC). Continuous wave light output from the light source is spilt and guided to the pair of modulators. The pair of modulators modulate the continuous wave light respectively with corresponding data signal, and generate a pair of modulated optical signals. The polarization beam combiner generates a polarization multiplexed optical signal illustrated in FIG. 1B by combining the pair of modulated optical signals. In other words, in the polarization multiplexing, two data streams are transmitted using two polarized waves (H polarization and V polarization) that have the same wavelength and are orthogonal to each other.

Accordingly, in the polarization multiplexing, the data speed becomes half, realizing the improvement of the characteristics of the electric-signal generation circuit and reduces the cost, size and power consumption of the circuit. In addition, the characteristics of the optical transmission system as a whole is improved, as influences from quality-degradation factors such as dispersion on the optical transmission path are reduced. As related arts, configurations described in Japanese Laid-open Patent Publication No. 2008-172714 and Japanese Laid-open Patent Publication No. 2009-63835 have been proposed.

However, in a polarization multiplexed optical transmitter that generates a polarization multiplexed optical signal, a modulator is provided for each polarization as illustrated in FIG. 1A. For this reason, the balance of characteristics between the polarizations in the polarization multiplexed output optical signal may deteriorate, due to factors such as manufacturing variability of characteristics between the modulators (for example, loss of the LN modulator) and characteristics of the optical splitter and/or the optical combiner. When unbalance occurs in the characteristics between the polarizations, the characteristics of the transmission signal deteriorates.

SUMMARY

According to an aspect of an invention, a polarization multiplexed optical transmitter includes: a first modulation unit to generate a first modulated optical signal by phase modulation and intensity modulation according to first data, the first modulation unit including a Mach-Zehnder interferometer and a first phase shifter to give a phase difference between optical paths of the Mach-Zehnder interferometer; a second modulation unit to generate a second modulated optical signal by phase modulation and intensity modulation according to second data, the second modulation unit including a Mach-Zehnder interferometer and a second phase shifter to give a phase difference between optical paths of the Mach-Zehnder interferometer; a combiner to generate a polarization multiplexed optical signal by combining the first and second modulated optical signals; a phase controller to control phase differences by the first and second phase shifters; and a signal controller to control an operation state of at least one of the first and second modulation units. The phase controller controls the phase differences by the first and second phase shifters to a specified target value when the first and second data are transmitted, and controls the phase difference by the first phase shifter to the target value and the phase difference by the second phase shifter to a value shifted by an amount of $\pi$ from the target value during an adjustment operation. A data pattern of the first data is same as the second data or reversed pattern of the second data during the adjustment operation. The signal controller controls an operation state of at least one of the first and second modulation units based on an optical intensity waveform of the polarization multiplexed optical signal during the adjustment operation.

According to another aspect of an invention, a polarization multiplexed optical transmitter includes: a first modulation unit to generate a first modulated optical signal by phase modulation and intensity modulation according to first data; a second modulation unit to generate a second modulated optical signal by phase modulation and intensity modulation according to second data; a combiner to generate a polarization multiplexed optical signal by combining the first and second modulated optical signals; and a controller to control an operation state of at least one of the first and second modulation units based on the polarization multiplexed optical signal. The first modulation unit has a Mach-Zehnder interferometer. An optical device to output the first modulated optical signal and a reversed signal of the first modulated optical signal is provided at an output terminal of the Mach-Zehnder interferometer. First and second adjustment data are inserted into the identical position of the first and second data, respectively. A data pattern of the first adjustment data is same as the second adjustment data or reversed pattern of the second adjustment data. The controller controls an operation state of at least one of the first and second modulation units based on an optical intensity waveform of an adjustment polarization multiplexed optical signal in which the reversed signal of the first modulated optical signal and the second modulated optical signal are multiplexed, in a time period in which the first and second adjustment data are inserted.

According to another aspect of an invention, a method for controlling a polarization multiplexed optical signal in a polarization multiplexed optical transmitter comprising a first modulation unit to generate a first modulated optical signal by phase modulation and intensity modulation according to first data, the first modulation unit including a Mach-Zehnder interferometer and a first phase shifter to give a phase difference between optical paths of the Mach-Zehnder interferometer; a second modulation unit to generate a second modulated optical signal by phase modulation and intensity modulation according to second data, the second modulation unit including a Mach-Zehnder interferometer and a second phase shifter to give a phase difference between optical paths of the Mach-Zehnder interferometer; and a combiner to generate a polarization multiplexed optical signal by combining the first and second modulated optical signals. The method includes: controlling the phase difference by the first phase shifter to a specified target value and the phase difference by the second phase shifter to a value shifted by an amount of $\pi$ from the target value; providing first and second control data to the first and second modulation units, respectively, a data pattern of the first control data being same as the second control data or reversed pattern of the second control data; and controlling an operation state of at least one of the first and second modulation units based on an optical intensity waveform of the polarization multiplexed optical signal generated when the first and second control data are being provided to the first and second modulation units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating the configuration of a polarization multiplexed optical transmitter according to an embodiment.

FIG. 8 is a diagram illustrating the polarization component of the polarization multiplexed optical signal at the time of data transmission.

FIG. 10A-FIG. 10C are diagrams illustrating the relationship between the timing error between polarizations and the optical intensity of the polarization multiplexed optical signal.

FIG. 11A-FIG. 11C are diagrams illustrating the relationship between the Tr/Tf time difference between polarizations and the optical intensity of the polarization multiplexed optical signal.

FIG. 13A, FIG. 13B, FIG. 14A and FIG. 14B are diagrams illustrating a procedure to control the balance between polarizations.

FIG. 15A, FIG. 15B, FIG. 16A and FIG. 16B are other embodiments of the BPSK modulator.

FIG. 18A and FIG. 18B are diagrams describing the operation of the modulator illustrated in FIG. 17A and FIG. 17B.

FIG. 19 is a diagram illustrating the polarization component of the polarization multiplexed optical signal in which QPSK modulated signals are multiplexed.

FIG. 21A-FIG. 21C are diagrams illustrating the relationship between the timing error between polarizations and the optical intensity of the polarization multiplexed optical signal in QPSK.

FIG. 22A-FIG. 22C are diagrams illustrating the relationship between the Tr/Tf time difference between polarizations and the optical intensity of the polarization multiplexed optical signal in QPSK.

FIG. 23A-FIG. 23C are diagrams illustrating the relationship between the optical power difference between polarizations and the optical intensity of the polarization multiplexed optical signal in QPSK.

DESCRIPTION OF EMBODIMENTS

Figure 1A:
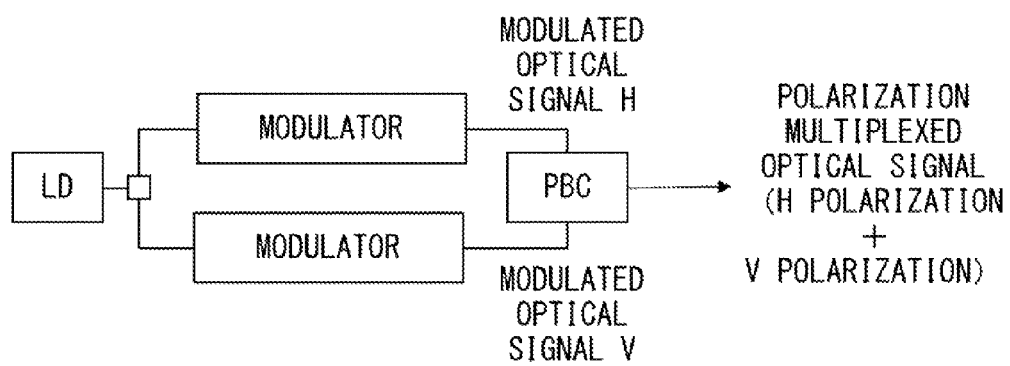
FIG. 1A and FIG. 1B are diagrams describing polarization multiplexing.

FIG. 2 illustrates the configuration of a polarization multiplexed optical transmitter according to an embodiment. The polarization multiplexed optical transmitter according to the embodiment transmits a polarization multiplexed optical signal obtained by combining first and second modulated optical signals. The polarization multiplexed optical signal carries data to a receiving station using a pair of polarized waves (H polarization and V polarization) that are orthogonal to each other. Here, if the characteristics of the H polarization signal and the V polarization signal are different from each other, the characteristics of the polarization multiplexed optical signal deteriorate. Therefore, in the polarization multiplexed optical transmitter according to the embodiment, control to make the characteristics of the H polarization signal and the H polarization signal the same as each other or approximately the same as each other is performed. The polarization multiplexed optical transmitter according to the embodiment has functions to control the following three characteristics.
(1) Timing error (difference in the delay) between the H polarization signal and the V polarization signal
(2) Difference in the rising/falling times (difference in Tr/Tf) of the optical intensity waveforms of the H polarization signal and the V polarization signal
(3) Optical power difference between the H polarization and the Y polarization A light source (LD) 1 generates an optical signal of a certain frequency. The light source 1 is, for example, a laser diode. The optical signal generated by the light source is, for example, a continuous wave (CW). An optical splitter 2 splits the continuous wave light generated by the light source 1 and guides the light to first and second modulation units. The powers of the pair of continuous wave lights output from the optical splitter 2 are the same as each other. The optical splitter 2 is, in the example illustrated in FIG. 2, a polarization beam splitter (PBS). However, the optical splitter 2 does not need to be a polarization beam splitter.

The first modulation unit has a modulator 11, a driver 13, a delay element 14 and an optical attenuator 15. Similarly, the second modulation unit has a modulator 21, a driver 23, a delay element 24 and an optical attenuator 25. The pair of the continuous wave lights output from the optical splitter 2 are given to the modulators 11 and 21. The first and second modulation units modulate the input CW lights in the same modulation scheme as each other.

The modulators 11 and 21 are, in this example, modulators in which the power of the output light periodically changes according to the drive voltage (for example, LN modulator including a Mach-Zehnder interferometer). Here, the modulator 11 has a phase shifter 12 that gives a phase difference between a pair of optical paths of the Mach-Zehnder interferometer. The modulator 11 generates a modulated optical signal H by modulating the input CW light according to data 1. Similarly, the modulator 21 has a phase shifter 22 that gives a phase difference between a pair of optical paths of the Mach-Zehnder interferometer. The modulator 21 generates a modulated optical signal V by modulating the input CW light according to data 2. The modulated optical signal H and the modulated optical signal V are optical signals carried by the H polarization and the V polarization, respectively.

The driver 13 generates a drive voltage signal representing the data 1 and gives the signal to the modulator 11. Similarly, the driver 23 generates a drive voltage signal representing the data 2 and gives the signal to the modulator 21. Meanwhile, the modulators 11 and 21 respectively have a bias control circuit that is not illustrated in the drawing, for controlling the operating point (that is, the DC bias) of the LN modulator. The bias control circuit is, for example, an ABC (Auto Bias Control) circuit. For example, the ABC circuit applies a low-frequency voltage signal to the corresponding LN modulator, and adjusts the operating point (that is, the DC bias voltage) of the corresponding LN modulator based on the low-frequency component contained in the output light of the modulators 11 and 21.

Meanwhile, while the LN modulator is described as an example of the modulators 11 and 21 herein, the invention is not limited to this configuration. The modulators 11 and 21 are not limited to the LN modulator, and may be a modulator using an electro-optic material, for example, a modulator including semiconductor material such as InP.

Delay elements 14 and 24 are provided between the data generators 31 and 32, and the drivers 13 and 23, respectively. The delay element 14 delays the data 1 generated by the data generator 31. In the same manner, the delay element 24 delays the data 2 generated by the data generator 32. The delay time of the delay elements 14 and 24 are controlled by a controller 43.

The optical attenuators 15 and 25 adjust the modulated optical signals H and V, respectively. The optical attenuators 15 and 25 may be provided on the input side of the modulators 11 and 21, or may be provided within the modulators 11 and 21, or may be provided on the output side of the modulators 11 and 21, respectively.

Figure 1B:
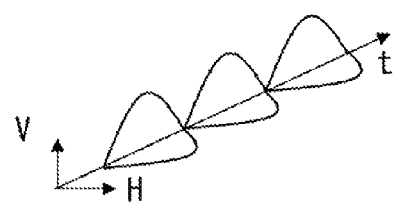

A polarization beam combiner (PBC) 3 generates a polarization multiplexed optical signal by combining the modulated optical signals H and V. Here, in the polarization multiplexing, H polarization and V polarization that are orthogonal to each other are used, as illustrated in FIG. 1B. That is, the modulated optical signal H (data 1) is carried using the H polarization, and the modulated optical signal V (data 2) is carried using the V polarization. While there is no particular limitation, for example, the polarization multiplexed optical transmitter according to the embodiment transmits data by DP-NRZ-MPSK (Dual Polarization NRZ M-Phase Shift Keying) or by NRZ-MPSK, where MPSK is $2^n$ phase shift keying (n is an integer).

The data generators 31 and 32 generate data 1 and 2, respectively. When the polarization multiplexed optical transmitter transmits data to a receiving station, the data generators 31 and 32 generate transmission data 1 and 2 as the data 1 and 2, respectively. At the time of adjusting, the data generators 31 and 32 generate control data 1 and 2, as the data 1 and 2, respectively.

When the polarization multiplexed optical transmitter configured as described above transmits data to a receiving station, the phase shifters 12 and 22 are respectively controlled to a specified target value in advance according to the modulation scheme. Meanwhile, the data generators 31 and 32 generate the transmission data 1 and 2 as described above. The modulator 11 generates the modulated optical signal H corresponding to the transmission data 1 and the modulator 21 generates the modulated optical signal V corresponding to the transmission data 2. Then, the polarization multiplexed optical signal in which the modulated optical signals H and V are multiplexed is output.

The polarization multiplexed optical transmitter according to the embodiment has the following control system for optimizing the balance of a pair of polarization signals (H polarization signal and V polarization signal) contained in the polarization multiplexed optical signal.

A power splitter 41 splits a portion of the polarization multiplexed optical signal output from the polarization beam combiner 3. The portion of the polarization multiplexed optical signal split by the power splitter 41 contains the H polarization signal and the V polarization signal. Meanwhile, the major portion of the polarization multiplexed optical signal output from the polarization beam combiner 3 is guided to an optical fiber transmission path, for example.

An optical intensity monitor 42 has a photo detector (PD), and converts the polarization multiplexed optical signal split by the optical splitter 41 into an electric signal. That is, an electric signal representing the optical intensity of the polarization multiplexed optical signal is generated. The photo detector is, for example, a photo diode. The optical intensity monitor 42 preferably converts the polarization multiplexed optical signal by a photo detector with which the polarization dependent loss (PDL) is small enough to be regarded as negligible.

The controller 43 controls the operation and state of the polarization multiplexed optical transmitter. In addition, the controller 43 provides a data transmission mode and an adjustment mode. In the data transmission mode, the polarization multiplexed optical transmitter transmits data to a receiving station. In the adjustment mode, devices in the polarization multiplexed optical transmitter are adjusted for adjusting the balance between the polarizations in the polarization multiplexed optical signal.

While there is no particular limitation, for example, the controller 43 is realized by executing a software program using a processor. In this case, the electric signal representing the polarization multiplexed optical signal is converted into digital data and then input to controller 43. Alternatively, the controller 43 may be equipped with an A/D converter.

The controller 43 has a phase controller 44, a data controller 45, and a signal controller 46. The phase controller 44 controls the phase difference between the optical paths of the Mach-Zehnder interferometer provided in the modulators 11 and 21, using an optical phase control signal. That is, the phase controller 44 controls the phase difference between the optical paths of the Mach-Zehnder interferometer in the phase modulators 11 and 21 to a target value corresponding to the modulation scheme, by controlling the phase shifters 12 and 22 during the data transmission mode. Meanwhile, during the adjustment mode, the phase controller 44 controls the phase difference between the optical paths of the Mach-Zehnder interferometer of the modulator 11 to the target value, and controls the phase difference between the optical paths of the Mach-Zehnder interferometer of the modulator 21 to a value shifted from the target value by $\pi$, where $\pi$ includes $\pi+2n\pi$ (n is an integer other than zero). Note that the phase difference between the optical paths of the Mach-Zehnder interferometer of each of the modulators 11 and 21 is controlled by, for example, DC bias voltage. In this case, the correspondence relationship between the DC bias voltage and the phase difference may be calculated and obtained in advance. Then the DC bias for the modulator 21 maybe shifted by the amount of voltage corresponding to the phase difference $\pi$.

The data controller 45 controls the data 1 and 2 generated by the data generators 31 and 32 using data switching instructions. During the data transmission mode, an instruction for outputting transmission data is given to the data generators 31 and 32. Meanwhile, during the adjustment mode, an instruction for outputting control data is given to the data generators 31 and 32. The control data are generated so as to satisfy "data 1=data 2" or "data 1=reverse pattern of data 2". In addition, data pattern of the control data is, for example, pseudo-random.

The signal controller 46 controls at least one of first and second modulation units according to the optical intensity of the polarization multiplexed optical signal detected by the optical intensity monitor 42 to improve or optimize the balance of a pair of polarization signals contained in the polarization multiplexed optical signal. The following three controls are performed in this embodiment.
(1) to reduce the timing error (delay time difference) between polarizations
(2) to reduce the difference in the rising/falling times (Tr/Tf difference) of the optical intensity waveform between polarizations
(3) to reduce the optical power difference between polarizations The timing error between polarizations is controlled by adjusting the delay amount of the delay elements 14 and 24 using a delay adjustment signal. For example, when the V polarization signal is delayed behind the H polarization signal, a delay adjustment signal to increase the delay of the delay element 14 or to reduce the delay of the delay element 24 is generated. Meanwhile, the polarization multiplexed optical transmitter according to the embodiment does not need to be equipped with both of the delay elements 14 and 24, and may be configured to have either one of the delay elements 14 and 24. In addition, the timing error between the polarizations may be controlled by adjusting other delay elements.

The difference in Tr/Tf between the polarizations is adjusted by adjusting the drive current of the drivers 13 and 23 using a drive adjustment signal. In this example, it is assumed that the drivers 13 and 23 respectively have an amplifier that amplifies an input signal, and the drive current of the amplifier is controlled according to the drive adjustment signal. In this case, when the drive current of the amplifier increases, the response speed of the drivers 13 and 23 increases, and the time taken for data signals to transit between "0" and "1" is shortened. As a result, the Tr/Tf of the modulated optical signal generated by the modulators 11 and 21 is shortened. For example, when the Tr/Tf of the H polarization signal is longer than the Tr/Tf of the V polarization signal, the drive adjustment signal to increase the drive current of the driver 13 or to reduce the drive current of the driver 23 is generated. Meanwhile, the polarization multiplexed optical transmitter according to the embodiment maybe configured to control only one of the drivers 13 and 23. In addition, the difference in Tr/Tf between the polarizations may be controlled by adjusting other elements.

The optical power difference between the polarizations is controlled by adjusting the attenuation amount of the optical attenuators 15 and 25 using an optical power adjustment signal. For example, when the optical power of the H polarization is higher than that of the V polarization signal, the optical power adjustment signal to increase the attenuation amount of the optical attenuator 15 or to reduce the attenuation amount of the optical attenuator 25 is generated. The polarization multiplexed optical transmitter according to the embodiment does not need to be equipped with both of the optical attenuators 15 and 25, and may be configured to have either one of the optical attenuators 15 and 25. In addition, the optical power difference between the polarizations may be controlled by adjusting other elements.

As described above, according to the polarization multiplexed optical transmitter according to the embodiment, in the adjustment mode, feedback control to reduce (preferable, to minimize) the timing error, the Tr/Tf difference, and the optical power difference between the polarizations is performed. By this feedback control, an operation status to generate a polarization multiplexed optical signal with good quality is realized. Therefore, by transmitting data in this operation status, the quality of the polarization multiplexed optical signal is improved. Note that the timing error, the Tr/Tf difference and the optical power balance may be generated independently from each other, and may be adjusted independently from each other.

Next, the modulation scheme of the modulators 11 and 21 provided in the polarization multiplexed optical transmitter according to the embodiment is explained. In this example, while there is no particular limitation, for example, the modulators 11 and 21 perform phase modulation and intensity modulation according to input data. For the phase modulation, BPSK and QPSK are explained below. In the intensity modulation, the optical intensity changes in the time period in which data changes.

Figure 3A:
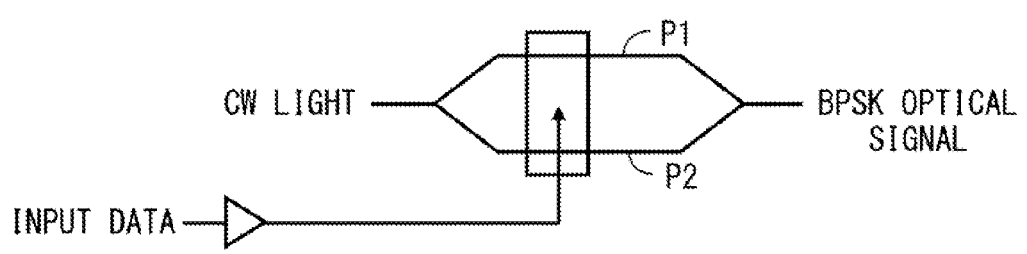
FIG. 3A and FIG. 3B are diagrams illustrating BPSK modulator.
Figure 3B:
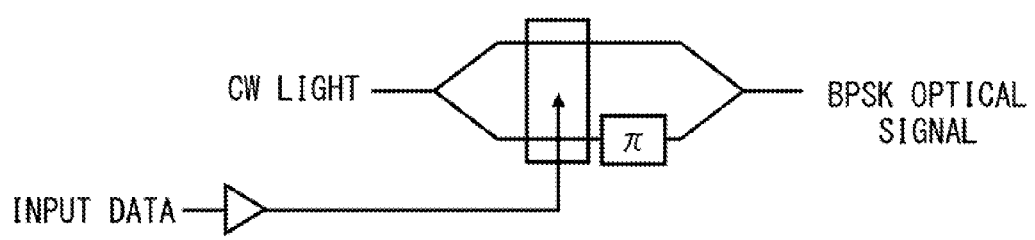

FIG. 3A and FIG. 3B illustrate an example of the configuration of the modulators 11 and 21. The modulation scheme of each of the modulators is BPSK. Each of the modulators respectively includes a Mach-Zehnder interferometer. The Mach-Zehnder interferometer has a pair of optical paths P1 and P2, and an input CW light is split equally and guided to the optical paths P1 and P2. The modulator illustrated in FIG. 3A and FIG. 3B is a single drive configuration.

The phase difference between the optical paths P1 and P2 is controlled to a specified target value using a phase shifter. In the example illustrated in FIG. 3A, the phase difference between the optical paths P1 and P2 is controlled to zero. The phase difference between the optical paths P1 and P2 is controlled by the DC voltage applied to the optical waveguide forming the optical paths P1 and P2. In addition, the phase shifter to provide the phase difference corresponds to the phase shifters 12 and 22 in the configuration illustrated in FIG. 2. By controlling the operating point of the modulator, for example, the phase of the output light is modulated to "π" when the input data is "1", and the phase of the output light is modulated to "0" when the input data is "0". That is, a modulated optical signal carrying the input data is generated.

At the time of adjusting the polarization multiplexed optical transmitter, in one of the modulators 11 and 21, the phase difference between the optical paths P1 and P2 is controlled to the value shifted from the target value by π, as illustrated in FIG. 3B. In this example, the phase difference π is added in the modulator 21. That is, at the time of adjusting the polarization multiplexed optical transmitter, the modulator 11 is controlled to the state illustrated in FIG. 3A, and the modulator 21 is controlled to the state illustrated in FIG. 3B.

Figure 4A:
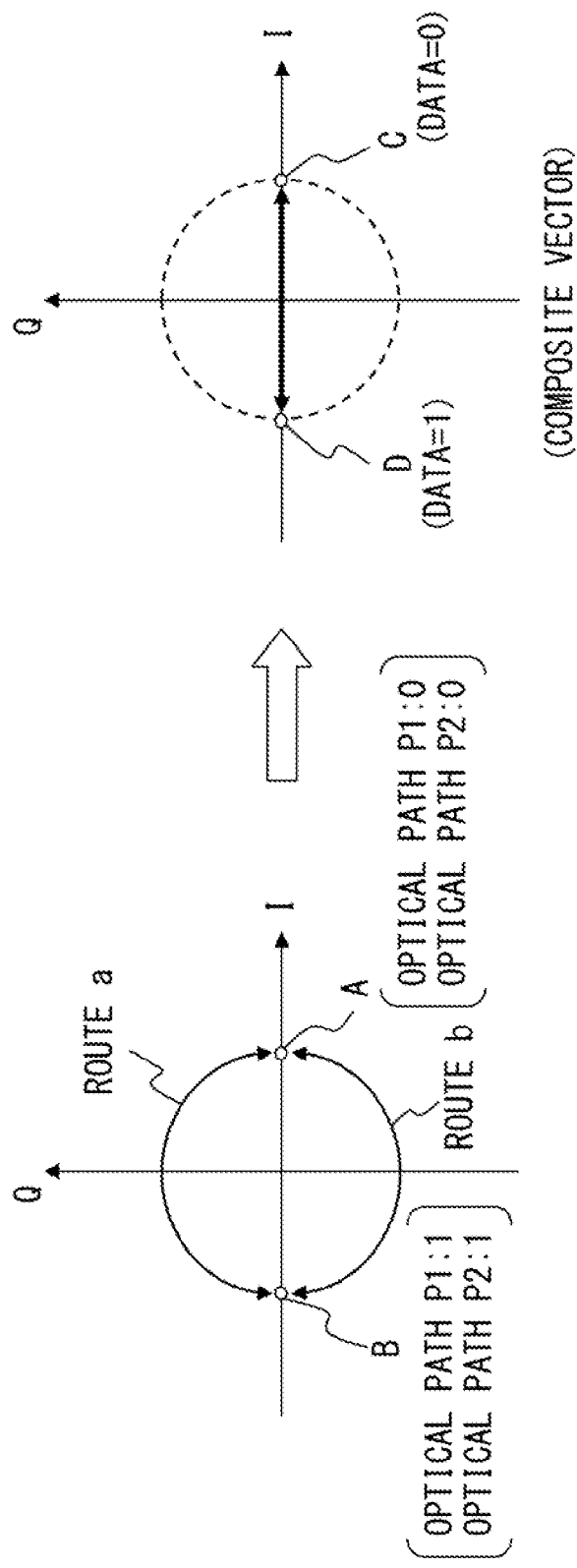
FIG. 4A and FIG. 4B are diagrams describing the operation of the modulator illustrated in FIG. 3A and FIG. 3B.
Figure 4B:
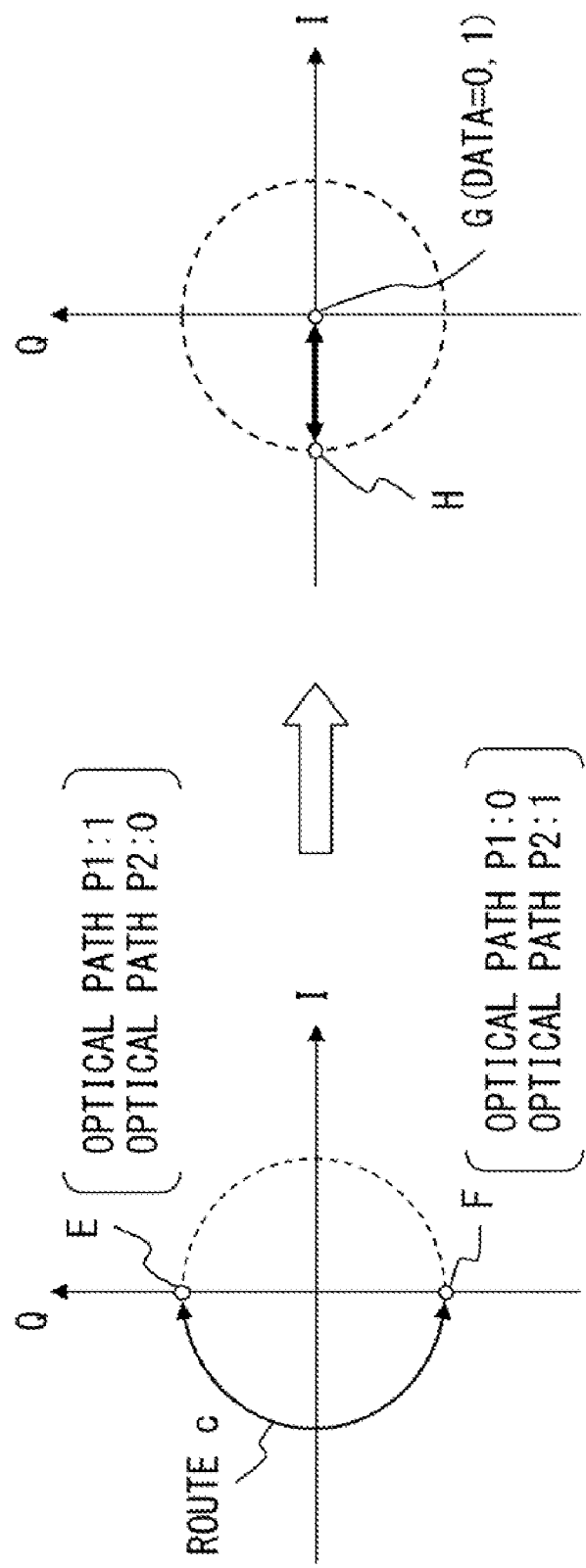

FIG. 4A and FIG. 4B illustrate the operation of the modulator illustrated in FIG. 3A and FIG. 3B. FIG. 4A and FIG. 4B represent the electric field vector of the modulated optical signals generated by the modulator controlled to be the state illustrated in FIG. 3A and FIG. 3B, respectively. In the following description, it is assumed that the modulated optical signal generated by the modulator illustrated in FIG. 3A is used as the H polarization signal, and the modulated optical signal generated by the modulator illustrated in FIG. 3B is used as the V polarization signal.

In the phase status illustrated in FIG. 3A, when the input data is "0", the optical signal generated on the optical path P1 is represented by a signal point A, and the optical signal generated on the optical path P2 is also represented by the signal point A. When the input data is "1", the optical signal generated on the optical path P1 is represented by the signal point B, and the optical signal generated on the optical path P2 is also represented by the signal point B.

The electric field vector of the optical signal output from the modulator illustrated in FIG. 3A (H polarization signal) is obtained by compositing the electric field vector of the optical signal generated on the optical path P1 and the electric field vector of the optical signal generated on the optical path P2. Thus, the electric field vector of the H polarization signal is represented by a signal point C when the input data is "0", and represented by a signal point D when the input data is "1". Here, the power of the optical signal is represented by the square of the distance from the origin to the corresponding signal point.

In the modulator configured as described above, when the input data transits from "0" to "1", the electric field vector of the optical signal generated on the optical path P1 moves from the signal point A to the signal point B through a route a. The electric field vector of the optical signal generated on the optical path P2 also moves from the signal point A to the signal point B through a route b. Here, the electric field vector of the H polarization signal is obtained by compositing the two electric field vectors. Thus, the electric field vector of the H polarization signal moves from the signal point C to the signal point D through the origin, when the two electric field vectors moves from the signal point A to the signal point B. Therefore, when the input data transit from "0" to "1", the power of the H polarization signal once becomes zero. Similarly, when the input data transit from "1" to "0", the electric field vector of the H polarization signal moves from the signal point D to the signal point C through the origin. That is, when the input data transits from "1" to "0", the power of the H polarization also once becomes zero. Thus, the H polarization signal generated at the time of adjusting the polarization multiplexed optical transmitter is an intensity modulated optical signal having an optical power of a local minimum value (ideally, zero) in the time period in which the input data changes(transit from "0" to "1", or transit from "1" to "0").

In the modulator illustrated in FIG. 3B, the phase difference between the optical paths P1 and P2 is shifted from the target value by π. For this reason, in this modulator, as illustrated in FIG. 4B, when the input data is "0", the optical signal generated on the optical path P1 is represented by a signal point F, and the optical signal generated on the optical path P2 is represented by a signal point E. When the input data is "1", the optical signal generated on the optical path P1 is represented by the signal point E, and the optical signal generated on the optical path P2 is represented by the signal point F.

The electric field vector of the optical signal output from the modulator illustrated in FIG. 3B (V polarization signal) is represented by a signal point G (that is, the origin) in both cases when the input data is "0" and when the input data is "1". Therefore, the power of the V polarization signal is zero during in the adjustment mode.

However, when the input data transit from "0" to "1", the electric field vector of the optical signal generated on the optical path P1 moves from the signal point F to the signal point E through a route c. The electric field vector of the optical signal generated on the optical path P2 moves from the signal point E to the signal point F through the route c. Therefore, when the input data transit from "0" to "1", the electric field vector of the V polarization signal moves from the signal point G to a signal point H and then returns to the signal point G. The same applies to the case when the input data transits from "1" to "0". That is, V polarization signal is an intensity modulated optical signal having certain optical power only in the time period in which the input data changes.

Figure 5:
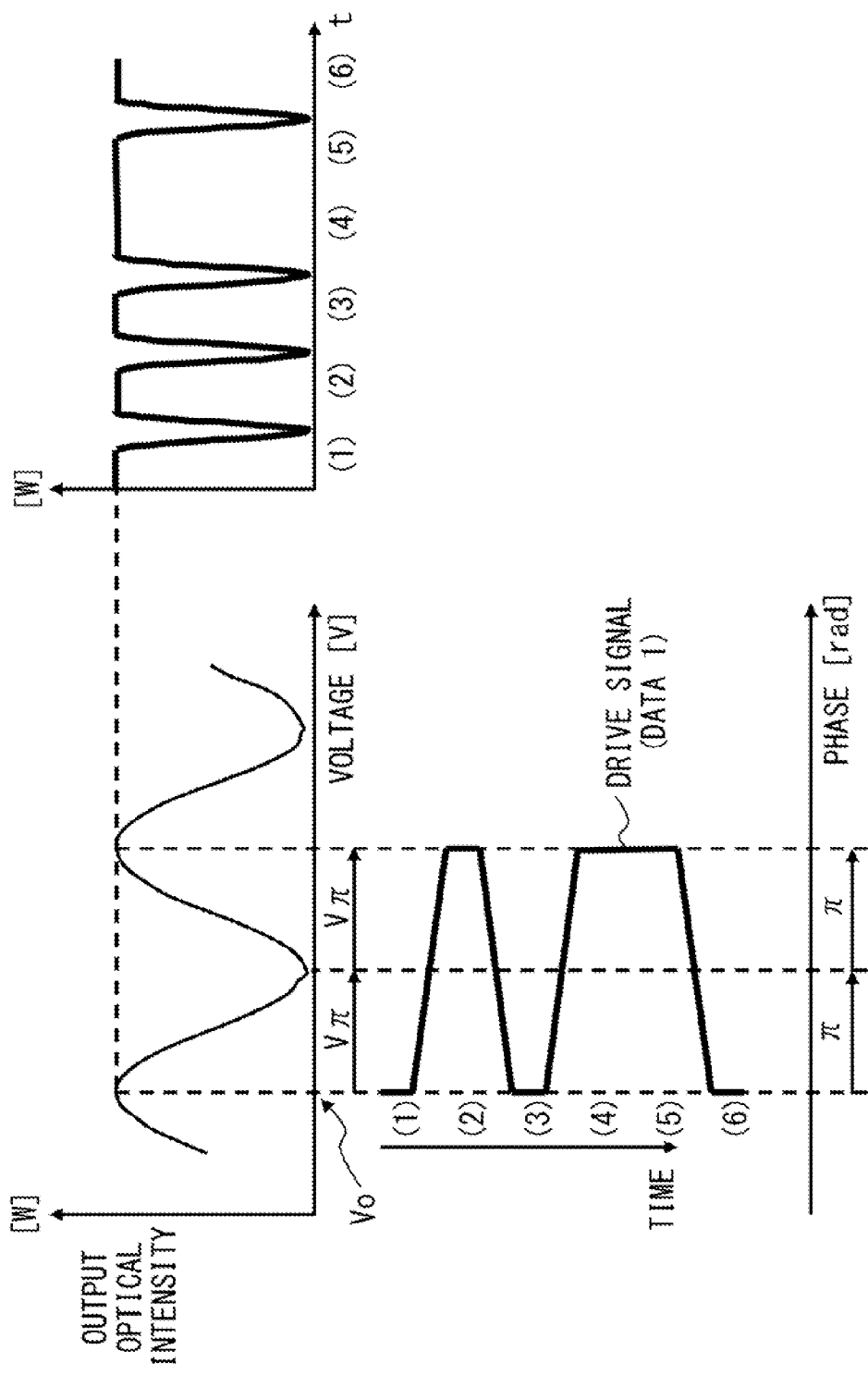
FIG. 5 is a diagram illustrating the operation to generate an H polarization signal.

FIG. 5 illustrates the generation of the modulated optical signal H used as the H polarization signal. The sine curve illustrated in FIG. 5 represents a characteristic (drive voltage-output optical power characteristic) of the modulator illustrated in FIG. 3A. In this example, a drive voltage signal for first-sixth symbol of data string is applied to the modulator.

In FIG. 5, the data of the first symbol is "0". In this case, "$V_0$" is applied to the modulator as the drive voltage, and the output optical power is "1 (normalized value)". Next, the data of the second symbol is "1". In this case, "$V_0+2V\pi$" is applied to the modulator, and the output optical power is "1". Here, $V\pi$ represents the drive voltage for changing the optical phase by the amount of π in the Mach-Zehnder interferometer. Thus, the power of the modulated optical signal generated by the modulator illustrated in FIG. 3A (that is, the power of the H polarization signal) is "1" regardless of the input data.

However, when the input data changes, the power of the H polarization signal also changes. For example, at the time of the transition from the first symbol to the second symbol, the drive voltage changes from "$V_0$" to "$V_0+2V\pi$" continuously. During this transition of data, the output optical power of the modulator once decreases from "1" to "0" and then returns to "1". That is, the H polarization signal has a local minimum value (ideally, zero) of the optical power in the time period in which the input data changes.

Figure 6:
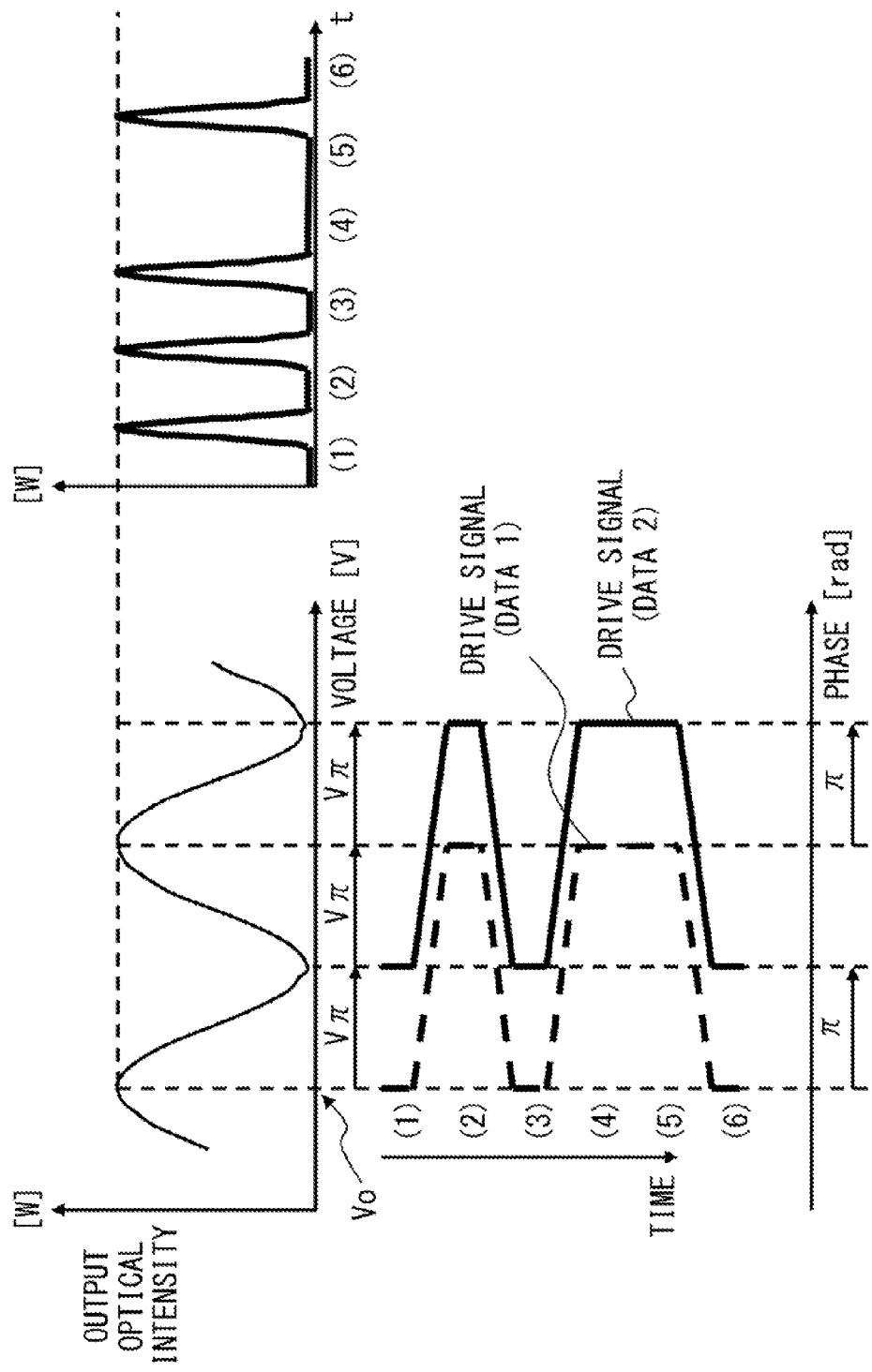
FIG. 6 is a diagram illustrating the operation to generate a V polarization signal.

FIG. 6 illustrates the generation of the modulated optical signal V used as the V polarization signal. In the modulator that generates the modulated optical signal V, as illustrated in FIG. 3B, the phase difference between the optical paths of the Mach-Zehnder interferometer is shifted by $\pi$. The phase difference $\pi$ is realized by applying the DC voltage $V\pi$ to the modulator. Therefore, when the input data is "0", "$V_0+V\pi$" is applied to the modulator, and the output optical power is "0". When the input data is "1", "$V_0+3V\pi$" is applied to the modulator, and the output optical power is "0". Thus, the power of the modulated optical signal (that is, the power of the V polarization signal) is "0" regardless of the input data.

However, similar to the H polarization signal, when the input data changes, the power of the V polarization signal also changes. That is, for example, at the time of the transition from the first symbol to the second symbol, the drive voltage changes from "$V_0$" to "$V_0+3V\pi$" continuously. During this transition of data, the output power of the modulator increases from "0" to "1" and then returns to "0". That is, the V polarization signal has the peak of the optical power in the time period in which the input data changes.

In the examples illustrated in FIG. 5 and FIG. 6, the H polarization signal and V polarization signal are generated by the identical input data. That is, the data 1 and data 2 input to the modulators 11 and 21 at the time of adjusting the polarization multiplexed optical transmitter have the same data pattern as each other. However, for the modulator provided in the polarization multiplexed optical transmitter according to the embodiment, as is obvious from the drive voltage-output optical power characteristic illustrated in FIG. 5 or FIG. 6, even when the input data is reversed, the optical power of the output signal does not change. Therefore, the data pattern of the data for generating the H polarization signal may be the reversed pattern of the data for generating the V polarization signal. That is, at the time of adjusting the polarization multiplexed optical transmitter, the data 1 input to the modulator 11 may be the reversed pattern of the data 2 input to the modulator 21.

Figure 7:
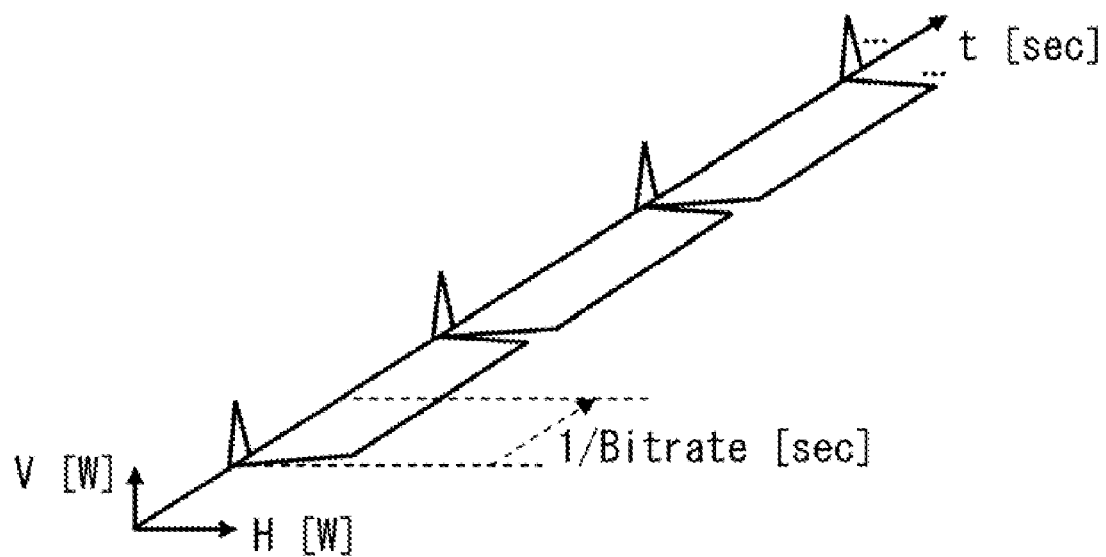
FIG. 7 is a diagram illustrating the polarization component of the polarization multiplexed optical signal generated at the time of adjustment.

FIG. 7 illustrates the polarization components (H axis component and V axis component) of the polarization multiplexed optical signal generated at the time of adjustment. Here, the H axis component propagates the output signal of the modulator illustrated in FIG. 3A, and the V axis component propagates the output signal of the modulator illustrated in FIG. 3B. The input data for each of the modulators are the same as each other. In this case, the H polarization signal has a local minimum of the optical power when the input data change. In contrast, the V polarization signal has the peak of the optical power when the input data changes.

FIG. 8 illustrates the polarization components of the polarization multiplexed optical signal at the time of data transmission. At the time of data transmission, both the modulators 11 and 21 are controlled to the state illustrated in FIG. 3A. The input data for the modulators 11 and 21 are independent from each other.

Figure 9:
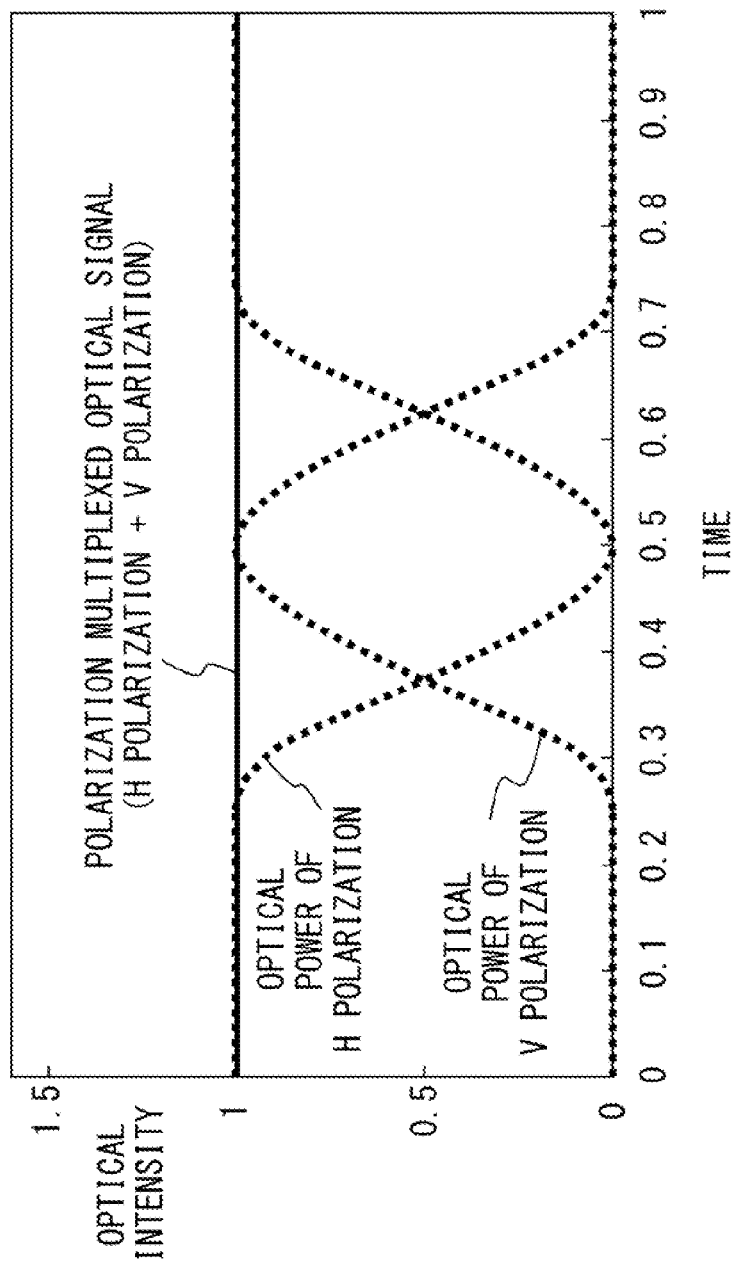
FIG. 9 is a diagram illustrating the power of the polarization multiplexed optical signal and each polarization component.

FIG. 9 illustrates the optical intensity of the polarization multiplexed optical signal and each polarization component generated at the time of adjusting the polarization multiplexed optical transmitter. In FIG. 9, the power of the polarization multiplexed optical signal is normalized to "1", and the symbol time period is normalized to "1".

The intensity (or the optical power) of the polarization multiplexed optical signal is the sum of the optical intensity of the H polarization component and the intensity of the V polarization component. Here, the H polarization signal and the V polarization signal are optical signals in reverse phases from each other. Therefore, in the ideal state in which the following three conditions are satisfied, the sum of the optical intensity of the H polarization component and the intensity of the V polarization component (that is, the optical intensity of the polarization multiplexed optical signal) is constant. In the example illustrated in FIG. 9, the optical intensity of the polarization multiplexed optical signal is constantly "1".
(1) the timing error between the polarization is zero
(2) the Tr/Tf difference between the polarization is zero (the Tr/Tf of the H polarization signal and the V polarization signal are the same)
(3) the optical power difference between the polarizations is zero (the optical powers of the H polarization signal and the V polarization signal are the same)

In other words, when one or more of the above three conditions are not satisfied, the optical intensity of the polarization multiplexed optical signal changes from "1". That is, when one or more of the above three conditions are not satisfied, the optical intensity waveform of the polarization multiplexed optical signal is distorted in the time period in which the input data changes. Therefore, the polarization multiplexed optical transmitter according to the embodiment monitors the distortion of the optical intensity of the polarization multiplexed optical signal, and performs feedback control so as to compensate for the distortion. As a result of the feedback control, the above three conditions are satisfied, improving the balance between the polarizations and improving the transmission characteristics of the polarization multiplexed optical signal.

Figure 10C:
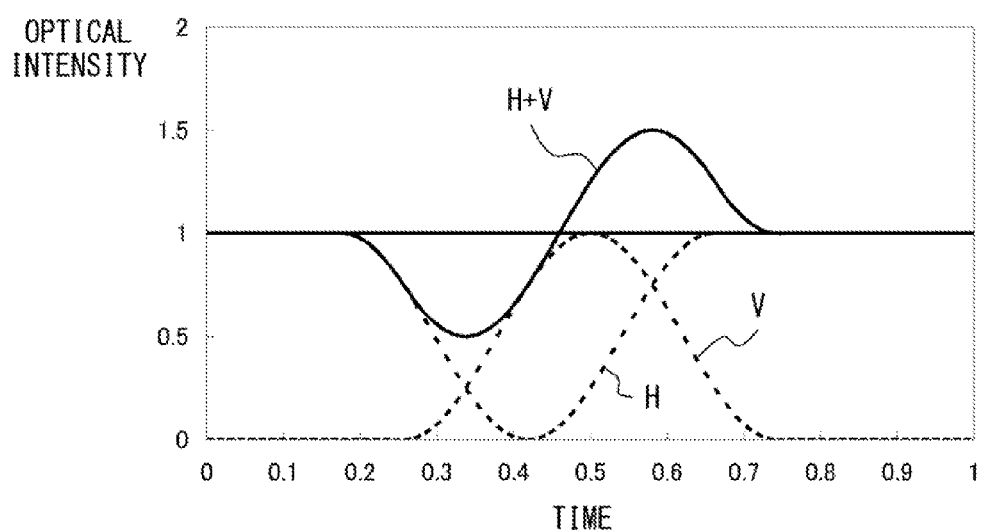

FIG. 10A-FIG. 10C illustrate the relationship between the timing error between the polarizations and the optical intensity of the polarization multiplexed optical signal. The optical intensity (H+V) of the polarization multiplexed optical signal is the sum of the optical intensity of the H polarization signal and the V polarization signal.

FIG. 10A illustrates the state in which the H polarization signal is delayed behind the V polarization signal. In this case, the optical intensity of the polarization multiplexed optical signal has a positive pulse in the period in which the input data changes, and has a negative pulse after the positive pulse. Here, the "positive pulse" represents the state in which the optical intensity is larger than the steady-state level, and the "negative pulse" represents the state in which the optical intensity is smaller than the steady-state level. Here, the steady-state level indicates the optical intensity in the time period in which the input data is not changing, which is "1" in FIG. 10A-FIG. 10C. When an optical intensity waveform in such a shape is detected, it is determined that the H polarization signal is delayed behind the V polarization signal.

When the H polarization signal is delayed behind the V polarization signal, the signal controller 46 reduces the delay time of the delay element 14 and/or increases the delay time of the delay element 24, so as to make the optical intensity of the polarization multiplexed optical signal constant (that is, to reduce the amplitude of the pair of the positive pulse and the negative pulse). Meanwhile, the timing error between the polarizations maybe adjusted in other methods. For example, a variable optical delay device may be provided on the output side of at least one of the modulators 11 and 21, and the timing error maybe adjusted by controlling the delay time of the variable optical delay device. Alternatively, the timing error between the polarizations may be adjusted by controlling the output timing of the data generators 31 and 32. For example, in a case where the data generators 31 and 32 are configured to have a D-flip flop circuit, the delay elements 14 and 24 may be realized by controlling the phase of a clock signal that instructs the output timing of the D-flip flop circuit.

FIG. 10B illustrates a state in which the timing error is larger than in FIG. 10A. As the timing error becomes larger, the amplitude and/or the pulse width of the optical intensity waveform of the polarization multiplexed optical signal becomes large. That is, by monitoring the amplitude and/or the pulse width of the optical intensity waveform of the polarization multiplexed optical signal, the timing error between the polarizations maybe detected. Therefore, the adjustment amount of the delay elements 14 and 24 may be calculated based on the amplitude or the pulse width of the optical intensity waveform.

When the timing error between the polarizations is larger than one symbol time period, the modulators 11 and 21 are driven by data that are different from each other for each symbol. In this case, the amplitude of the optical intensity waveform of the polarization multiplexed optical signal takes the maximum value. In other words, when the amplitude of the optical intensity waveform of the polarization multiplexed optical signal is larger than a specified threshold level, it is determined that the timing error between the polarizations is larger than one symbol time period.

FIG. 10C illustrates a state in which the V polarization signal is delayed behind the H polarization signal. In this case, the optical intensity of the polarization multiplexed optical signal has a negative pulse in the time period in which the input data changes, and has a positive pulse after the negative pulse. That is, when the optical intensity waveform in such a shape is detected, it is determined that the V polarization signal is delayed behind the H polarization signal. Thus, by monitoring the shape of the optical intensity waveform of the polarization multiplexed optical signal, the adjustment direction of the delay elements 14 and 24 is decided.

Figure 11A:
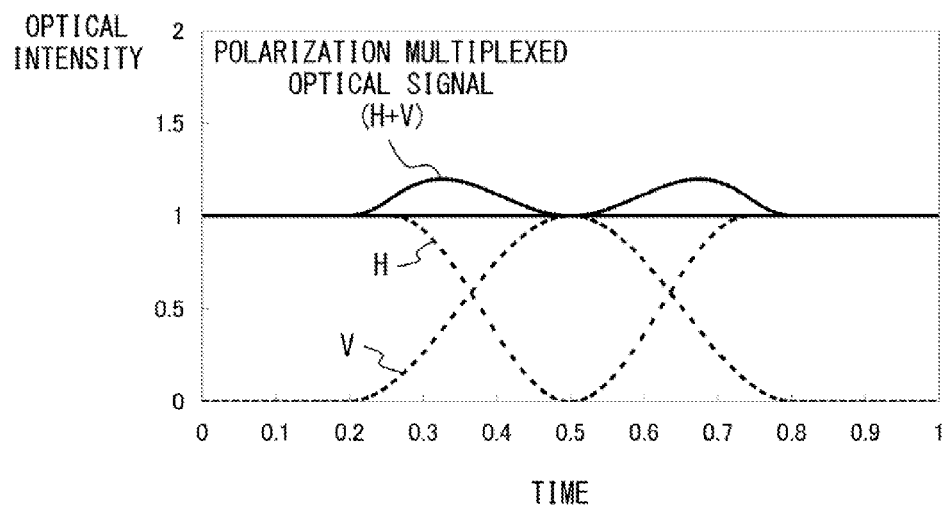

FIG. 11A-FIG. 11C illustrate the relationship between the Tr/Tf difference between the polarizations and the optical intensity. FIG. 11A illustrates a state in which the Tr/Tf of the V polarization signal is larger than the Tr/Tf of the H polarization signal. Specifically, in FIG. 11A, the rising time Tr of the V polarization signal is longer than that of the H polarization signal. In addition, the falling time Tf of the V polarization signal is longer than that of the H polarization signal. In this case, the optical intensity of the polarization multiplexed optical signal has two positive pulses in the time period in which the input data changes. That is, when an optical intensity waveform having such a shape is detected, it is determined that the Tr/Tf of the V polarization signal is larger than the Tr/Tf of the H polarization signal.

When the Tr/Tf of the V polarization signal is larger than the Tr/Tf of the H polarization signal, the signal controller 46 reduces the drive current of the driver 13 and/or increases the drive current of the driver 23, so as to make the optical intensity of the polarization multiplexed optical signal constant (that is, to reduce the amplitude of the pair of positive pulses). Meanwhile, the Tr/Tf of the polarization signal may be adjusted in other methods. For example, the Tr/Tf may be adjusted by controlling the transfer characteristic (such as the band of the low pass filter) of the drivers 13 and 23.

FIG. 11B illustrates a state in which the Tr/Tf difference is larger than in FIG. 11A. When the Tr/Tf difference between the polarizations becomes larger, the amplitude and/or the pulse width of the optical intensity waveform of the polarization multiplexed optical signal becomes large. That is, by monitoring the amplitude and/or the pulse width of the optical intensity waveform of the polarization multiplexed optical signal, the Tr/Tf difference between the polarizations maybe detected. Therefore, the adjustment amount of the drivers 13 and 23 may be calculated based on the amplitude and/or the pulse width of the optical intensity waveform.

FIG. 11C illustrates a state in which the Tr/Tf of the H polarization signal is larger than the Tr/Tf of the V polarization signal. In this case, the optical intensity of the polarization multiplexed optical signal has two negative pulses in the time period in which the input data changes. That is, when an optical intensity waveform having such a shape is detected, it is determined that the Tr/Tf of the H polarization signal is larger than the Tr/Tf of the V polarization signal. Thus, by monitoring the shape of the optical intensity waveform of the polarization multiplexed optical signal, the adjustment direction of the drivers 13 and 23 is decided.

Figure 12A:
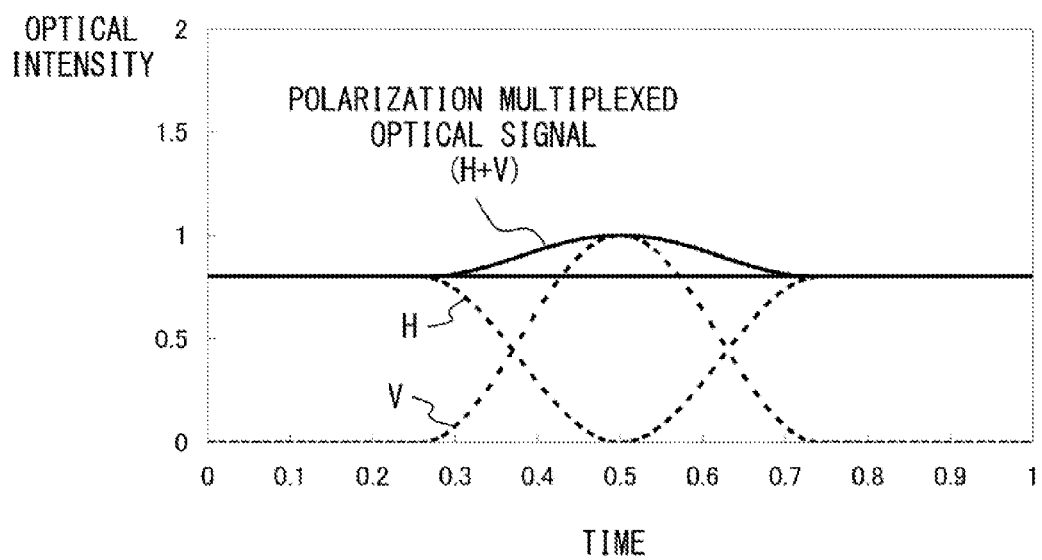
FIG. 12A-FIG. 12C are diagrams illustrating the relationship between the optical power difference between polarizations and the optical intensity of the polarization multiplexed optical signal.
Figure 12B:
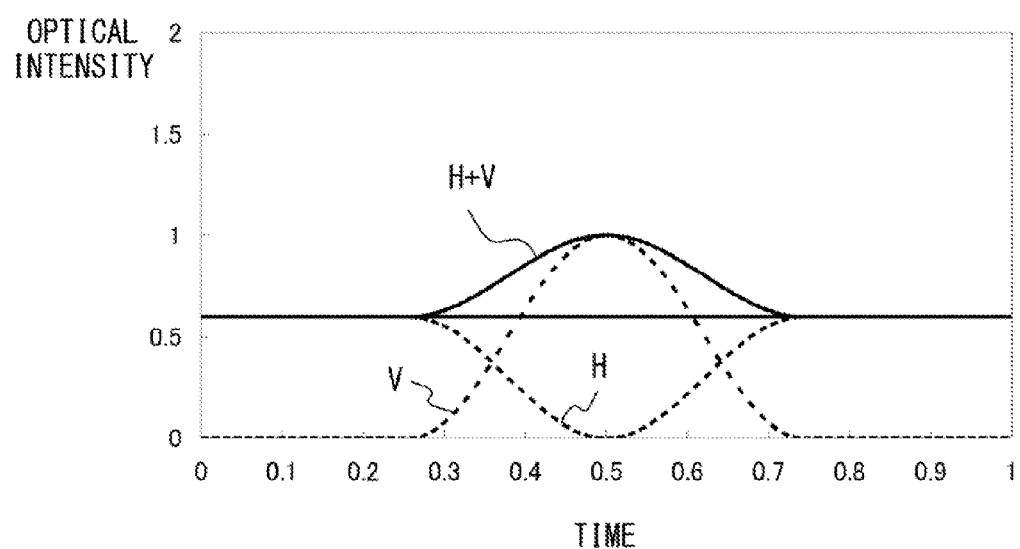
Figure 12C:
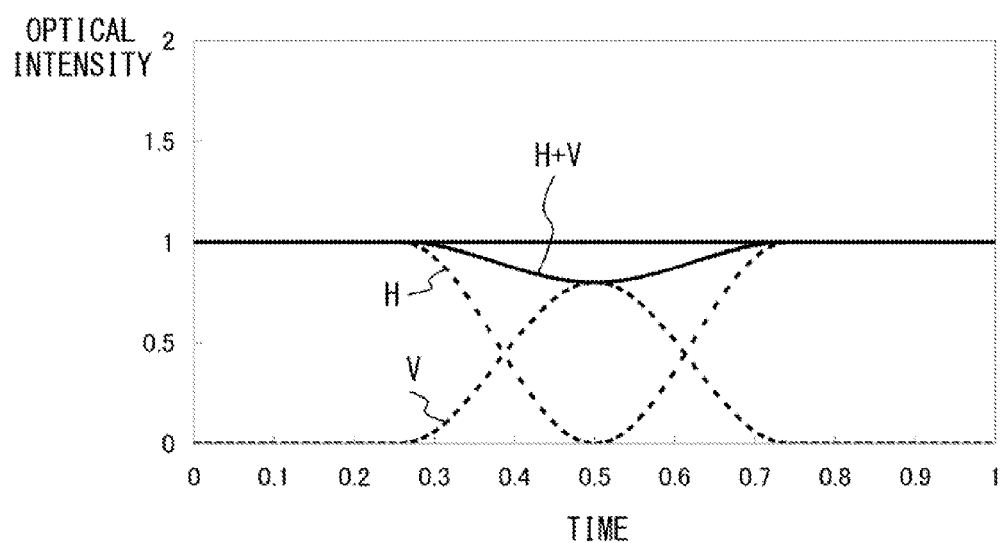

FIG. 12A-FIG. 12C illustrate the relationship between the optical power difference between the polarizations and the optical intensity. FIG. 12A illustrates a state in which the optical power of the V polarization signal is larger than the optical power of the H polarization signal. In this case, the optical intensity of the polarization multiplexed optical signal has one positive pulse in the time period in which the input data changes. That is, when an optical intensity waveform having such a shape is detected, it is determined that the optical power of the V polarization signal is larger than the optical power of the H polarization signal.

When the optical power of the V polarization signal is larger than the optical power of the H polarization signal, the signal controller 46 reduces the attenuation amount of the optical attenuator 15 and/or increases the attenuation amount of the optical attenuator 25, so as to make the optical intensity of the polarization multiplexed optical signal constant (that is, to reduce the amplitude of the pulse). Meanwhile, the optical power of the polarization signal maybe adjusted in other methods. For example, the optical power may be adjusted by controlling the amplitude of the output signal of the drivers 13 and 23. Alternatively, for example if the modulators 11 and 21 are Mach-Zehnder LN modulator, the optical power may be adjusted by controlling the bias of the LN modulator.

FIG. 12B illustrates a state in which the optical power difference is larger than in FIG. 12A. When the optical power difference between the polarizations becomes larger, the amplitude of the optical intensity waveform of the polarization multiplexed optical signal becomes large. That is, by monitoring the amplitude the optical intensity waveform of the polarization multiplexed optical signal, the optical power difference between the polarizations may be detected. Therefore, the adjustment amount of the optical attenuators 15 and 25 may be calculated based on the amplitude of the optical intensity waveform.

FIG. 12C illustrates a state in which the optical power of the H polarization signal is larger than the optical power of the V polarization signal. In this case, the optical intensity of the polarization multiplexed optical signal has one negative pulse in the time period in which the input data changes. That is, when an optical intensity waveform having such a shape is detected, it is determined that the optical power of the H polarization signal is larger than the optical power of the V polarization signal. Thus, by monitoring the shape of the optical intensity waveform of the polarization multiplexed optical signal, the adjustment direction of the optical attenuators 15 and 25 is decided.

Each element (the delay element, the driver, the optical attenuator etc.) may be adjusted in the dithering method. In the dithering method, for example, when controlling the optical power difference between polarizations, a low-frequency signal is superimposed on the DC voltage controlling the attenuation amount of the optical attenuators 15 and/or 25. Accordingly, the optical intensity of the generated polarization multiplexed optical signal contains a low-frequency signal component. Then, the controller 43 controls the DC voltage that controls the attenuation amount of the optical attenuators 15 and/or 25 using the detected low-frequency signal component.

Thus, the polarization multiplexed optical transmitter according to the embodiment detects the timing error, the Tr/Tf difference, and the optical power difference between polarizations by analyzing the optical intensity waveform of the polarization multiplexed optical signal. Then, the operation state of the polarization multiplexed optical transmitter is adjusted by feedback control so as to compensate for the detected timing error, Tr/Tf difference, and optical power difference. Therefore, by transmitting data after such adjustment, the transmission characteristic of the polarization multiplexed optical signal becomes good.

The three factors (the timing error, the Tr/Tf difference, the optical power difference) described above that degrade the characteristic of the polarization multiplexed optical signal occur independently from each other. That is, the three factors may occur at the same time. Hereinafter, the adjustment method in a case in which the three factors occur at the same time is described.

The power of the H polarization signal ($H_{power}$) generated by one of the modulators 11 and 21 (the modulator 11 hereinafter) is expressed by the following function. This H polarization signal corresponds to the output optical signal illustrated in FIG. 5, $$H_{Power} = A \times \frac{1+\cos\theta_H}{2} [W]$$

$$\theta_H = \frac{V_{DRV\_H}(t)}{V\pi} \times \pi [\text{rad}]$$

"A" represents the optical output peak power of the modulator 11. $V_{DRV\_H}(t)$ is a function of time and represents the drive voltage of the Mach-Zehnder interferometer provided in the modulator 11. $V\pi$ represents the drive voltage for shifting the optical phase by $\pi$ in the Mach-Zehnder interferometer.

The power of the V polarization signal ($V_{power}$) generated by the other of the modulators 11 and 21 (the modulator 21 hereinafter) is expressed by the following function. This V polarization signal corresponds to the output optical signal illustrated in FIG. 6, $$V_{Power} = B \times \frac{1+\cos\theta_V}{2} [W]$$

$$\theta_V = \frac{V_{DRV\_V}(t)}{V\pi} \times \pi + \pi [\text{rad}]$$

"B" represents the optical output peak power of the modulator 21. $V_{DRV\_V}(t)$ is a function of time and represents the drive voltage of the Mach-Zehnder interferometer provided in the modulator 21.

The power of the polarization multiplexed optical power is the sum of the powers of the H polarization signal and the V polarization signal, which is represented by the following expression.

Function representing the polarization multiplexed optical signal=$H_{Power}+V_{Power}$ In the function representing the polarization multiplexed optical signal, the timing error between the polarizations (or the delay difference) is expressed by the time difference between $V_{DRV\_H}(t)$ and $V_{DRV\_V}(t)$. The Tr/Tf difference between the polarizations is expressed by the difference between the differentiation of $V_{DRV\_H}(t)$ with respect to time and the differentiation of $V_{DRV\_V}(t)$ with respect to time. The differentiation of $V_{DRV\_H}(t)$ and $V_{DRV\_V}(t)$ with respect to time is proportional to the differentiation of $\theta_H$ and $\theta_V$ with respect to time, respectively. The optical power difference between the polarizations is expressed by the difference between A and B.

Here, assuming that the timing error, the Tr/Tf difference and the optical power difference between the polarizations are all zero, $V_{DRV\_H}(t)=V_{DRV\_V}(t)$ and A=B is given for the function described above. Then the optical intensity of the polarization multiplexed optical signal becomes constantly "A". That is, no distortion is generated in the optical intensity waveform of the polarization multiplexed optical signal.

The method for adjusting the balance between the polarization multiplexed optical signal that is degraded due to the three factors described above is realized by the following procedures, for example.

In procedure A1, the polarization multiplexed optical signal in the time period in which the optical intensity modulation is made is extracted, Then, with the time period as one cycle of calculation, the extracted intensity modulated signal is expanded to Fourier series. That is, the extracted signal is expressed by a plurality of frequency spectra with respect to time.

In procedure A2, a fitting process is performed using the following three variables so that the output function of the optical intensity monitor 42 matches the function obtained in the procedure A1.

variable 1: $V_{DRV\_H}(t)$ and $V_{DRV\_V}(t)$
variable 2: the differentiation of $V_{DRV\_H}(t)$ with respect to time and the differentiation of $V_{DRV\_V}(t)$ with respect to time
variable 3: A and B In procedure A3, the following (1)-(3) are calculated based on the processing result obtained in the procedure A2.
(1) the difference between $V_{DRV\_H}(t)$ and $V_{DRV\_V}(t)$
(2) the difference between the differentiation of $V_{DRV\_H}(t)$ with respect to time and the differentiation of $V_{DRV\_V}(t)$ with respect to time
(3) the difference between A and B Then, these calculation results correspond to the timing error, the difference in the rising/falling times of the optical intensity modulation, the optical power between the polarizations, respectively.

In procedure A4, based on the results obtained in the procedure A3, corresponding elements (the delay elements 14 and 24, the drivers 13 and 23, the optical attenuators 15 and 25, etc.) are controlled so as to make each difference value (the timing error, the difference in the rising/falling times of the optical intensity modulation, the optical power difference) small.

In procedure A5, the procedures 1-3 are repeated for specified times.

In procedure A6, whether or not the three difference values are within a specified acceptable range is determined. When the difference values are within the acceptable range, the adjustment process is terminated. On the other hand, the difference values exceed the acceptable range, the process returns to the procedure A4.

The waveform distortion of the polarization multiplexed optical signal is approximately expressed by the sum of a function F1 representing the waveform distortion generated due to the timing error, a function F2 representing the waveform distortion generated due to the Tr/Tf difference, and a function F3 representing the waveform distortion generated due to the optical power difference. Here, if the characteristics of the Mach-Zehnder interferometer of the modulators 11 and 21 have been detected or calculated, the respective functions F1-F3 may be derived in advance. That is, based on the characteristics of the Mach-Zehnder interferometer of the modulators 11 and 21, the distortion component of the optical intensity waveform of the polarization multiplexed optical signal may be separated into functions F1, F2 and F3.

Alternatively, in the function $(=H_{Power}+V_{Power})$, for example, when "$V_{DRV\_H}(t)=V_{DRV\_V}(t)$" and "the differentiation of $V_{DRV\_H}(t)$ with respect to time=the differentiation of $V_{DRV\_V}(t)$ with respect to time" are given, the function F3 representing the distortion of the optical intensity waveform generated due to the optical power difference between the polarizations is obtained. Then, by scanning parameters A and B representing the amplitude of the polarization signals in the function F3, a template of the function representing the distortion due to the optical power difference between the polarizations may be created. The same applies to the functions representing the timing error and Tr/Tf difference between the polarizations. Therefore, by comparing the optical intensity waveform of the polarization multiplexed optical signal obtained by the optical intensity monitor 42 and the template of each function, the function component for the timing error, the Tr/Tf difference and the optical time difference may be extracted.

In addition, while the Fourier series expansion and fitting technique are used in the procedures described above, the adjustment method according to the embodiment is not limited to this. That is, other methods for comparing two functions and making the difference small by adjusting a variable based on the comparison result have been known, and the balance between the polarizations may be adjusted using those methods.

Another method for adjusting the balance between the polarizations of the polarization multiplexed optical signal degraded due to the three factors described above is realized by the following procedures, for example.

Figure 13A:
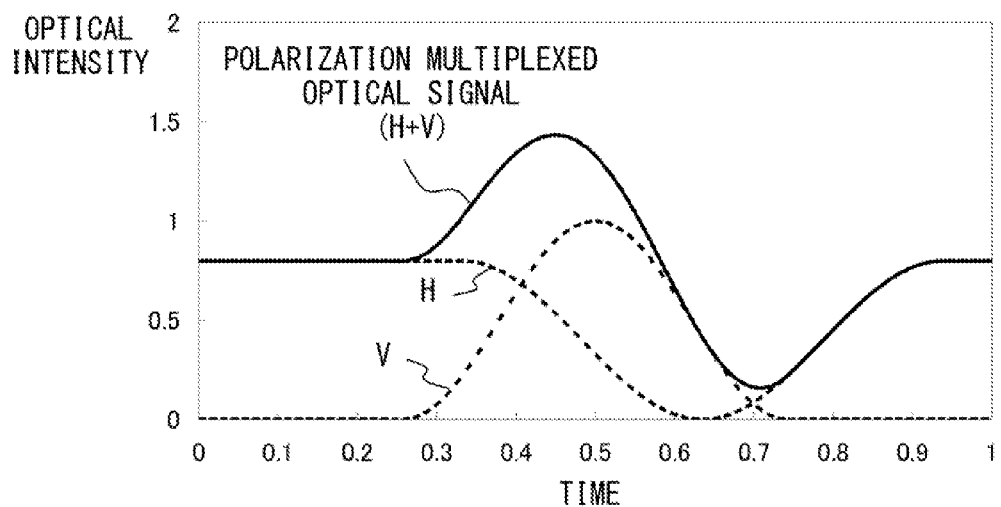

In procedure B1, the optical intensity waveform of the polarization multiplexed optical signal is analyzed. Here, it is assumed that the optical intensity waveform illustrated in FIG. 13A has been obtained. That is, it is assumed that the H polarization signal and the V polarization signal are in the following state.
(1) the H polarization signal is delayed behind the V polarization signal
(2) the Tr/Tf of the H polarization signal is larger than the Tr/Tf of the V polarization signal
(3) the optical power A of the H polarization signal is smaller than the optical power B of the V polarization signal (A/B=0.8)

In procedure B2, the delay amount of the delay elements 14 and 24 is adjusted so that the optical intensity waveform of the polarization multiplexed optical signal becomes a symmetric on the time axis. Here, the optical intensity waveform of the polarization multiplexed optical signal becomes symmetric on the time axis when the timing error between the H polarization signal and the V polarization signal is zero. Therefore, the controller 43 adjusts the timing error between the H polarization signal and the V polarization signal while monitoring the optical intensity waveform of the polarization multiplexed optical signal. In the optical intensity waveform illustrated in FIG. 13A, a positive pulse appears first, and a negative pulse appears after the positive pulse. Therefore, it is determined that the H polarization signal is delayed behind the V polarization signal. Accordingly, control to reduce the delay amount of the delay element 14 and/or to increase the delay amount of the delay element 24 is performed. As a result, the optical intensity waveform illustrated in FIG. 13B is obtained.

Figure 13B:
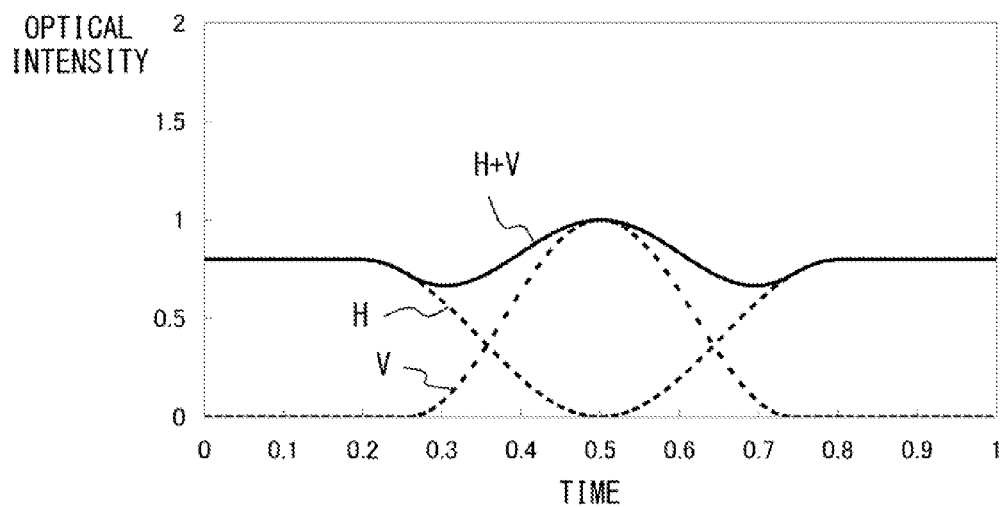

In procedure B3, the attenuation amount of the optical attenuators 15 and 25 is adjusted so that, for the optical intensity waveform illustrated in FIG. 13B, the optical intensity in the center area (that is, TIME=0.5) and the optical intensity in the steady state match each other. Here, in the optical intensity waveform of the polarization multiplexed optical signal, the optical intensity in the center area and the optical intensity in the steady state match each other when the power difference between the H polarization signal and the V polarization signal is zero. Therefore, the controller 43 adjusts the optical power of the H polarization signal and/or the V polarization signal while monitoring the optical intensity waveform of the polarization multiplexed optical signal. In this example, the optical intensity in the center area is "1", and the optical intensity in the steady state is "0.8". Therefore, in this case, it is determined that the optical power of the H polarization signal is smaller than the optical power of the V polarization signal. In this case, control to reduce the attenuation amount of the optical attenuator 15 and/or to increase the attenuation amount of the optical attenuator 25 is performed. Here, the optical attenuator 15 is controlled so that the optical intensity in the steady state becomes "1". As a result, the optical intensity waveform illustrated in FIG. 14A is obtained.

In procedure B4, the drive voltage of the drivers 13 and/or 23 is controlled so that the optical intensity of the polarization multiplexed optical signal becomes constant. In the optical intensity waveform illustrated in FIG. 14A, two negative pulses have appeared. In this case, it is determined that the Tr/Tf of the H polarization signal is larger than the Tr/Tf of the V polarization signal. In this case, control to increase the drive current of the driver 13 and/or to reduce the drive current of the driver 23 is performed. As a result, as illustrated in FIG. 14B, the optical intensity of the polarization multiplexed optical signal becomes constant.

The procedures B1-B4 are automatically performed by the controller 43 for example. In addition, the procedures B1-B4 may be performed with intervention by a human. In this case, for example, the optical intensity waveform of the polarization multiplexed optical signal is displayed on an oscilloscope. Then, by referring to the optical intensity waveform displayed on the oscilloscope, each element (the delay element, the driver, the optical attenuator) is adjusted by manual operation.

The optical intensity waveform may be easily monitored by using a high-speed oscilloscope (or a monitor device using a lowpass filter) as the optical intensity monitor 42. In addition, since the optical intensity monitor will suffice as long as it detects the distortion of the optical intensity waveform, it may be a device that detects the frequency band of the waveform distortion. That is, for example, it maybe an amplifier having a band bass filter that passes the frequency band of the waveform distortion through, or may be a simple spectrum analyzer.

The order to perform the procedures B1-B4 is not limited to the example described above. In addition, only a part of the procedures B1-B4 may be performed.

Furthermore, the modulation scheme of the modulators 11 and 21 is not limited to BPSK, and may be another MPSK (M=2$^n$) such as QPSK. When the number of bits per one symbol increases, control to optimize the balance between the polarization becomes complicated, but the procedures are similar to those in the case for BPSK described above.

Next, the variation of the polarization multiplexed optical transmitter according to the embodiment is described.

<Variations of the BPSK Modulator>

Each modulator is not limited to the single drive configuration illustrated in FIG. 3A and FIG. 3B, and may be the dual drive configuration illustrated in FIG. 15A and FIG. 15B. In this case, at the time of data transmission, the modulators 11 and 21 are controlled to the phase status illustrated in FIG. 15A. In the adjustment mode, one of the modulators 11 and 21 is controlled to the phase status illustrated in FIG. 15A, and the other of the modulators 11 and 21 is controlled to the phase status illustrated in FIG. 15B.

The optical paths P1 and P2 of each modulator may be coupled by an X coupler as illustrated in FIG. 16A and FIG. 16B. In this case, at the time of data transmission, the modulators 11 and 21 are controlled to the phase status illustrated in FIG. 16A. That is, phase $\pi/2$ is given to the optical path P1. The phase $\pi/2$ includes $\pi/2+2n\pi$ or $-\pi/2+2n\pi$ (n is an integer other than zero). Then, the modulated optical signal is output from a straight port for the optical path P1 (that is, a cross port for the optical path P2). In contrast, in the adjustment mode, one of the modulators 11 and 21 is controlled to the phase status illustrated in FIG. 16A, and the other of the modulators 11 and 21 is controlled to the phase status illustrated in FIG. 16B. The status illustrated in FIG. 16B is realized by giving phase $\pi/2$ to the optical path P2.

<QPSK>

While the modulators 11 and 21 are BPSK modulators in the description above, the polarization multiplexed optical transmitter according to the embodiment is not limited to this configuration. That is, the modulators 11 and 21 may be configured to perform modulation in another scheme.

Figure 17A:
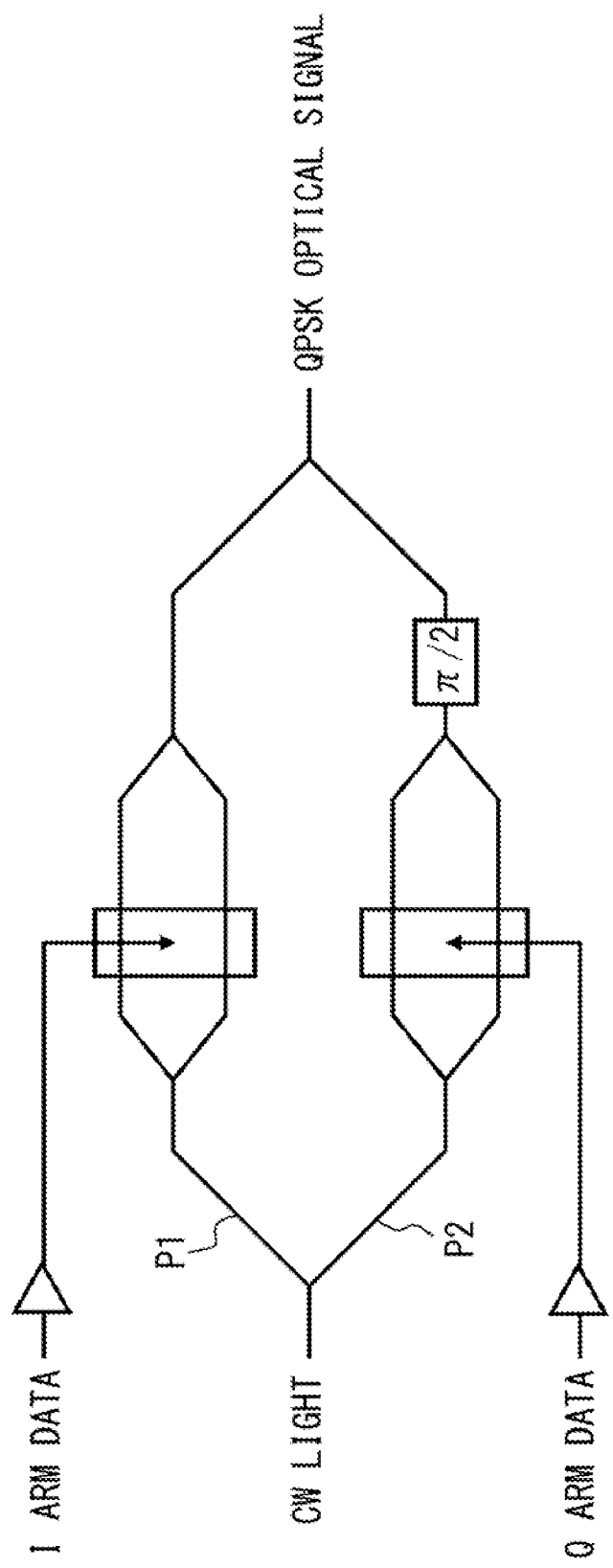
FIG. 17A and FIG. 17B are diagrams illustrating a QPSK modulator.

FIG. 17A illustrates the configuration of a modulator that performs QPSK modulation. In this modulator, the input CW light is spilt equally and guided to the optical paths P1 and P2. A Mach-Zehnder interferometer is provided on each of the optical paths P1 and P2. In this example, each Mach-Zehnder interferometer is the same as the BPSK modulator illustrated in FIG. 3A. Meanwhile, each Mach-Zehnder interferometer is not limited to this configuration, and the configuration illustrated in FIG. 15A or FIG. 16A may be adopted.

In QPSK, 2-bit data (I arm data and Q arm data) is input with every symbol. The Mach-Zehnder interferometer on the optical path P1 is driven by the I arm data, and the Mach-Zehnder interferometer on the optical path P2 is driven by the Q arm data. In addition, in QPSK, phase difference $\pi/2$ is given between the optical paths P1 and P2. The phase $\pi/2$ includes $\pi/2+2n\pi$ or $-\pi/2+2n\pi$ (n is an integer other than zero).

Figure 17B:
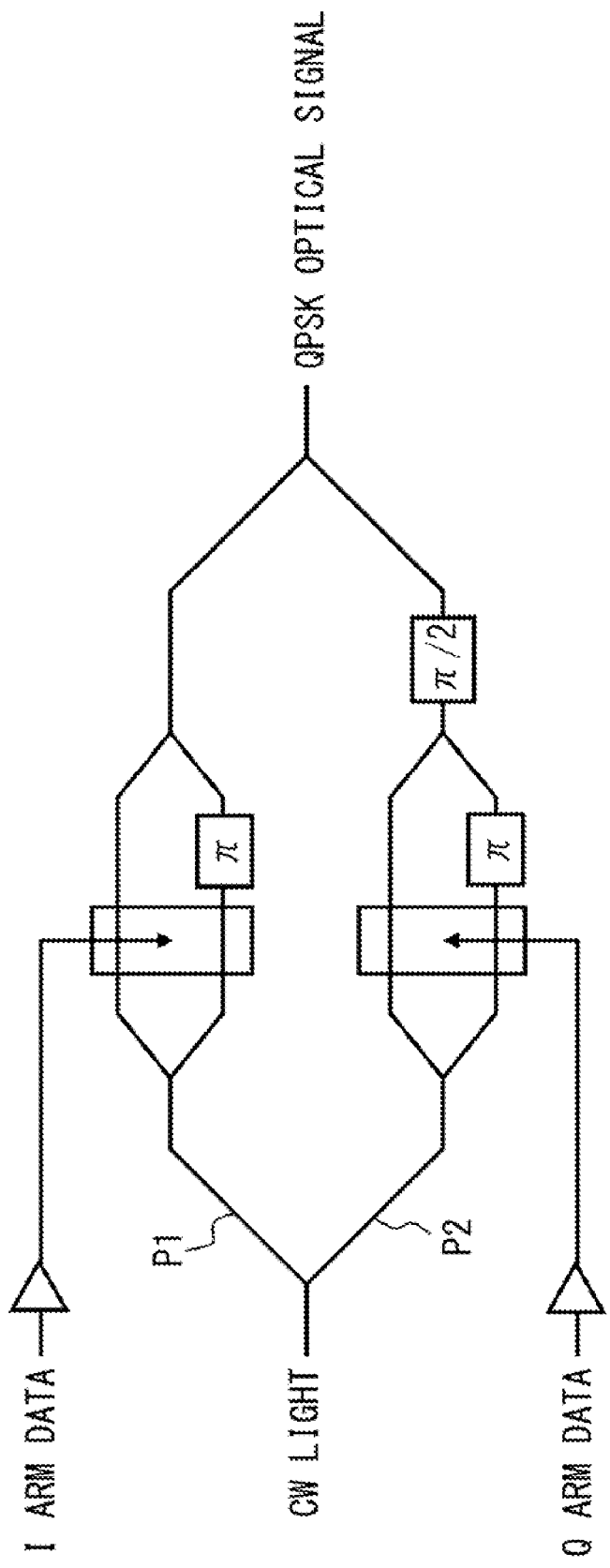

FIG. 18A and FIG. 18B illustrate the operation of the modulator illustrated in FIG. 17A and FIG. 17B. In the QPSK modulator illustrated in FIG. 17A, when the I arm data is "0", the electric field vector indicated by a signal point a1 in FIG. 18A is obtained. When the I arm data is "1", the electric field vector indicated by a signal point a2 is obtained. Similarly, when the Q arm data is "0", "1", the electric field vector indicated by signal points a3, a4 is obtained, respectively. Therefore, when the input 2-bit data is "00", "01", "11", "10", the electric field vector of the optical signal output from the QPSK modulator is indicated by the signal points b1, b2, b3, b4, respectively.

The electric field vector of the optical signal output from the QPSK modulator transits when the input 2-bit data changes. For example, when the 2-bit data changes from "00" to "11", the electric field vector transits from the signal point b1 to the signal point b3 through the origin. Here, the power of the optical signal is proportional to the square of the distance from the origin to a corresponding position. Therefore, during this transition of 2-bit data, the power of the optical signal once becomes zero. Meanwhile, when the 2-bit data changes from "00" to "01", the electric field vector transits from the signal point b1 to the signal point b2. In this transition process, the power of the optical signal once decreases, but does not become zero.

As described above, when the first bit and the second bit of the 2-bit data both change, the power of the optical signal once becomes zero during the transition. When only one of the bits of the 2-bit data changes, the power of the optical signal once decreases but does not become zero during the transition. Meanwhile, when the 2-bit data does not change, the power of the optical signal does not change.

In the adjustment mode, one of the modulators 11 and 21 is controlled to the state illustrated in FIG. 17B. In this example, the Mach-Zehnder interferometer on the optical paths P1 and P2 is respectively controlled to the state illustrated in FIG. 3B. That is, the phase difference between the optical paths of each Mach-Zehnder interferometer is shifted by $\pi$ from the target value. In this case, in each Mach-Zehnder interferometer, a pair of optical signals output from the pair of optical paths cancels each other. For this reason, the output of the QPSK modulator enters the no-light-emission state as illustrated in FIG. 18B. That is, the electric field vector of the output light is represented by the origin, as illustrated in FIG. 18B.

However, when both of the first bit and the second bit of the 2-bit data change, the state of the optical signal transits from the origin to the signal point c1 (one of the signal points b1-b4 in FIG. 18A) and then returns to the origin. In addition, when only one of the bits of the 2-bit data changes, the state of the optical signal transits from the origin to the signal point c2 (one of the signal points a1-a4 in FIG. 18A) and then returns to the origin.

FIG. 19 illustrates the polarization component of the polarization multiplexed optical signal in which two QPSK modulated optical signals are multiplexed. In the adjustment mode, the H polarization propagates the output signal of the modulator illustrated in FIG. 17A, and the V polarization propagates the output signal of the modulator illustrated in FIG. 17B. The 2-bit data (control data 1 and 2) input to the modulators (the modulators 11 and 12) are the same each other. In this case, the H polarization signal has a local minimum value of the optical power when the input data changes. At this time, the local minimum value at the time when both of the bits in the 2-bit data change becomes smaller than the local minimum value at the time when only one of the bits of the 2-bit data changes. Meanwhile, the V polarization signal has the peak of the optical power when the input data changes. At this time, the peak at the time when both of the bits in the 2-bit data change becomes larger than the peak at the time when only one of the bits of the 2-bit data changes.

Figure 20:
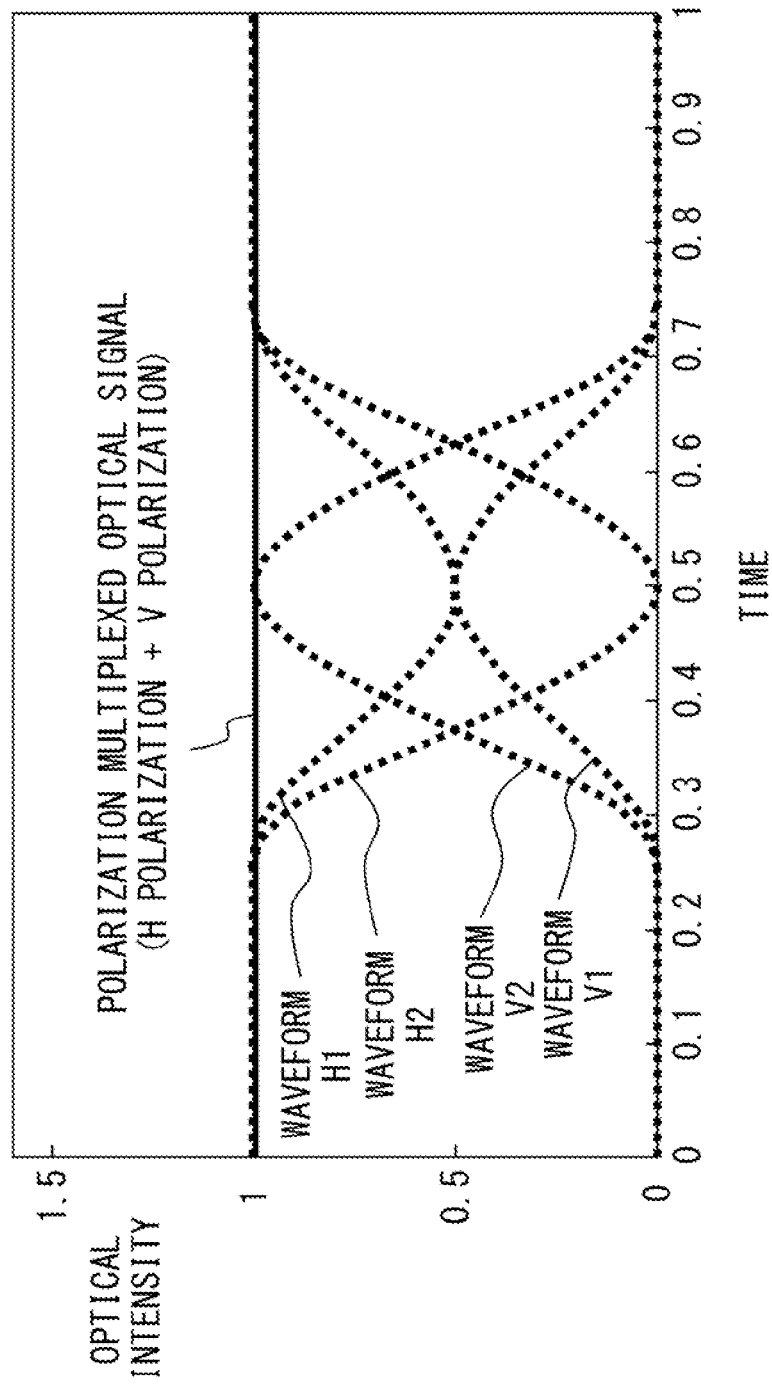
FIG. 20 is a diagram illustrating the power of the polarization multiplexed optical signal in which QPSK modulated signals are multiplexed and each polarization component.

FIG. 20 illustrates the power of the polarization multiplexed optical signal in which QPSK modulated optical signals are multiplexed and each polarization component. In FIG. 20, the power of the polarization multiplexed optical signal is normalized to "1", and symbol time period is normalized to "1".

The power of the polarization multiplexed optical signal is the sum of the powers of the H polarization and the V polarization. Here, the H polarization signal and the V polarization signal are optical signals in reverse phases from each other. Therefore, in an ideal state in which the three conditions described above (the timing error is zero, the Tr/Tf difference is zero, the optical power difference is zero between the polarizations) are satisfied, the sum of the powers of the H polarization signal and the V polarization signal (that is, the power of the polarization multiplexed optical signal) is constant.

Note that, as illustrated in FIG. 20, when both of the bits of the 2-bit data change, the optical powers of the H polarization signal and the V polarization signal change as represented by waveform H2 and waveform V2, respectively. When only one of the bits of the 2-bit data changes, the optical powers of the H polarization signal and the V polarization signal change as represented by waveform H1 and waveform V1, respectively. In either case, when the three conditions described above are satisfied, the power of the polarization multiplexed optical signal is constant.

Figure 21B:
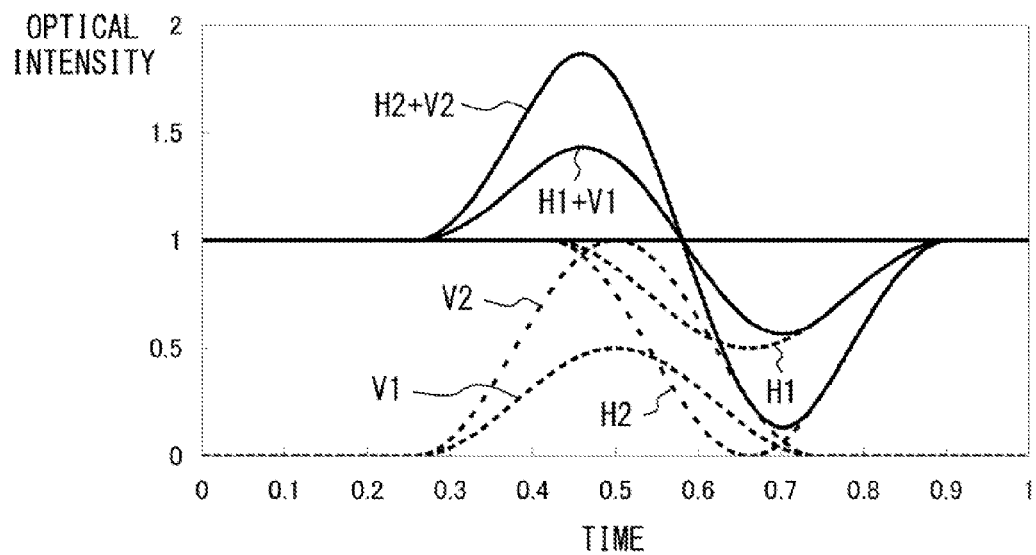

FIG. 21A-FIG. 21C illustrate the relationship between the timing error between the polarizations and the optical intensity of the polarization multiplexed optical signal in an optical transmitter using QPSK. FIG. 21A illustrates a state in which the H polarization signal is delayed behind the V polarization. FIG. 21B illustrates a state in which the timing error is larger than in FIG. 21A. FIG. 21C illustrates a state in which the V polarization signal is delayed behind the H polarization signal.

H1 and V1 respectively represent the optical intensity of the H polarization signal and the V polarization signal at the time when only one of the bits of corresponding 2-bit data transmitted in QPSK changes. In this case, the optical intensity of the polarization multiplexed optical signal is represented by H1+V1. Meanwhile, H2 and V2 respectively represent the optical intensity of the H polarization signal and the V polarization signal at the time when both of the bits of corresponding 2-bit data transmitted in QPSK changes. In this case, the optical intensity of the polarization multiplexed optical signal is represented by H2+V2.

Figure 22C:
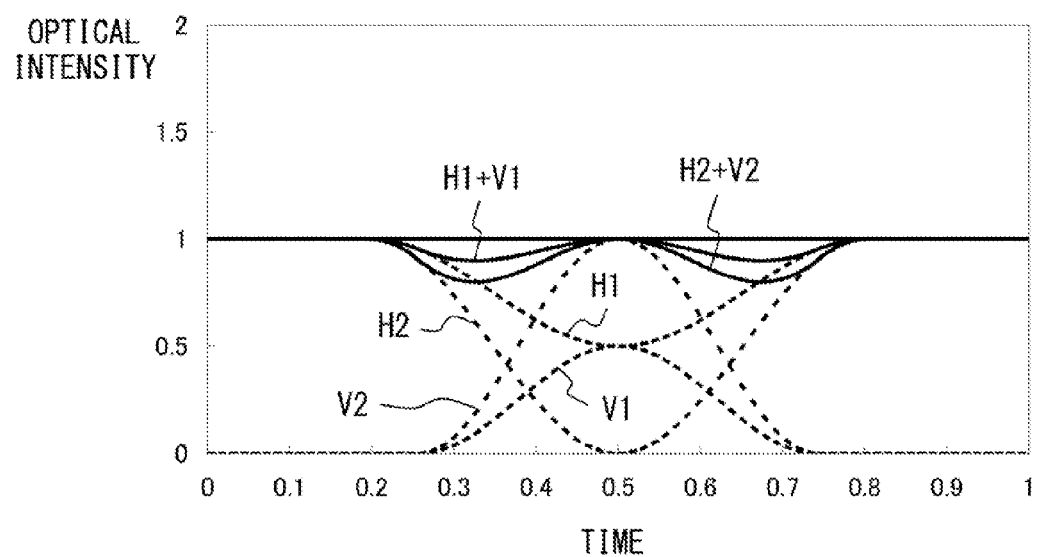

FIG. 22A-FIG. 22C illustrate the relationship between the Tr/Tf difference between the polarizations and the optical intensity of the polarization multiplexed optical signal in an optical transmitter using QPSK. FIG. 22A illustrates a state in which the Tr/Tf of the V polarization signal is larger than the Tr/Tf of the H polarization signal. FIG. 22B illustrates a state in which the Tr/Tf difference is larger than in FIG. 22A. FIG. 22C illustrates a state in which the Tr/Tf of the H polarization signal is larger than the Tr/Tf of the V polarization signal.

Figure 23C:
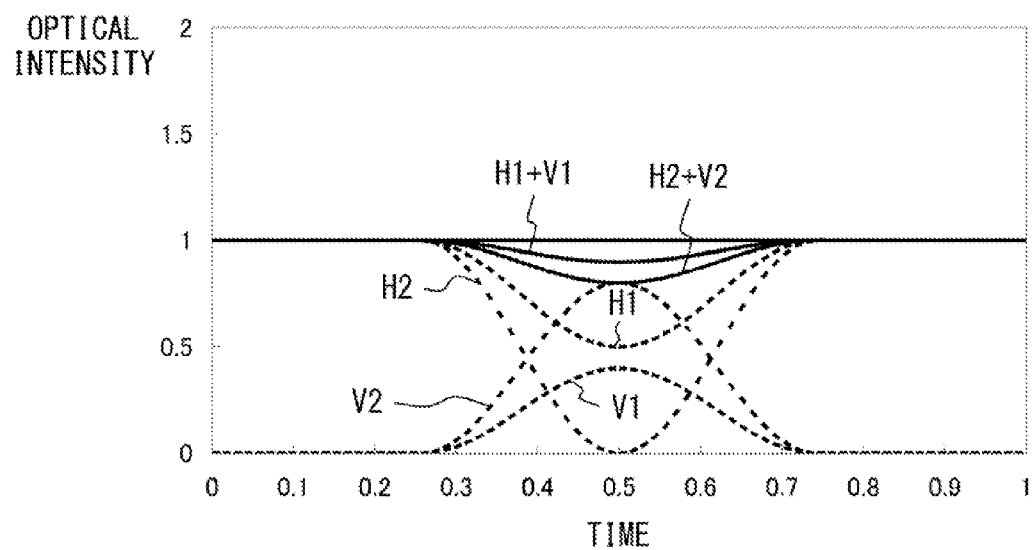

FIG. 23A-FIG. 23C illustrate the relationship between the optical power difference between the polarizations and the optical intensity of the polarization multiplexed optical signal in an optical transmitter using QPSK. FIG. 23A illustrates a state in which the optical power of the V polarization signal is larger than the optical power of the H polarization signal. FIG. 23B illustrates a state in which the optical power difference is larger than in FIG. 23A. FIG. 23C illustrates a state in which the optical power of the H polarization signal is larger than the optical power of the V polarization signal.

As described above, when the modulation scheme of the modulators 11 and 21 is QPSK, the optical intensity of the polarization multiplexed optical signal represents the same trend as in the case in which the modulation scheme of the modulators 11 and 21 is BPSK. Therefore, when the modulation scheme of the modulators 11 and 21 is QPSK, the balance between the polarizations may also be adjusted by the method described above. That is, the method described above may be applied to MPSK ($M=2^n$) modulation.

<Configuration with Two Light Sources>

Figure 24:
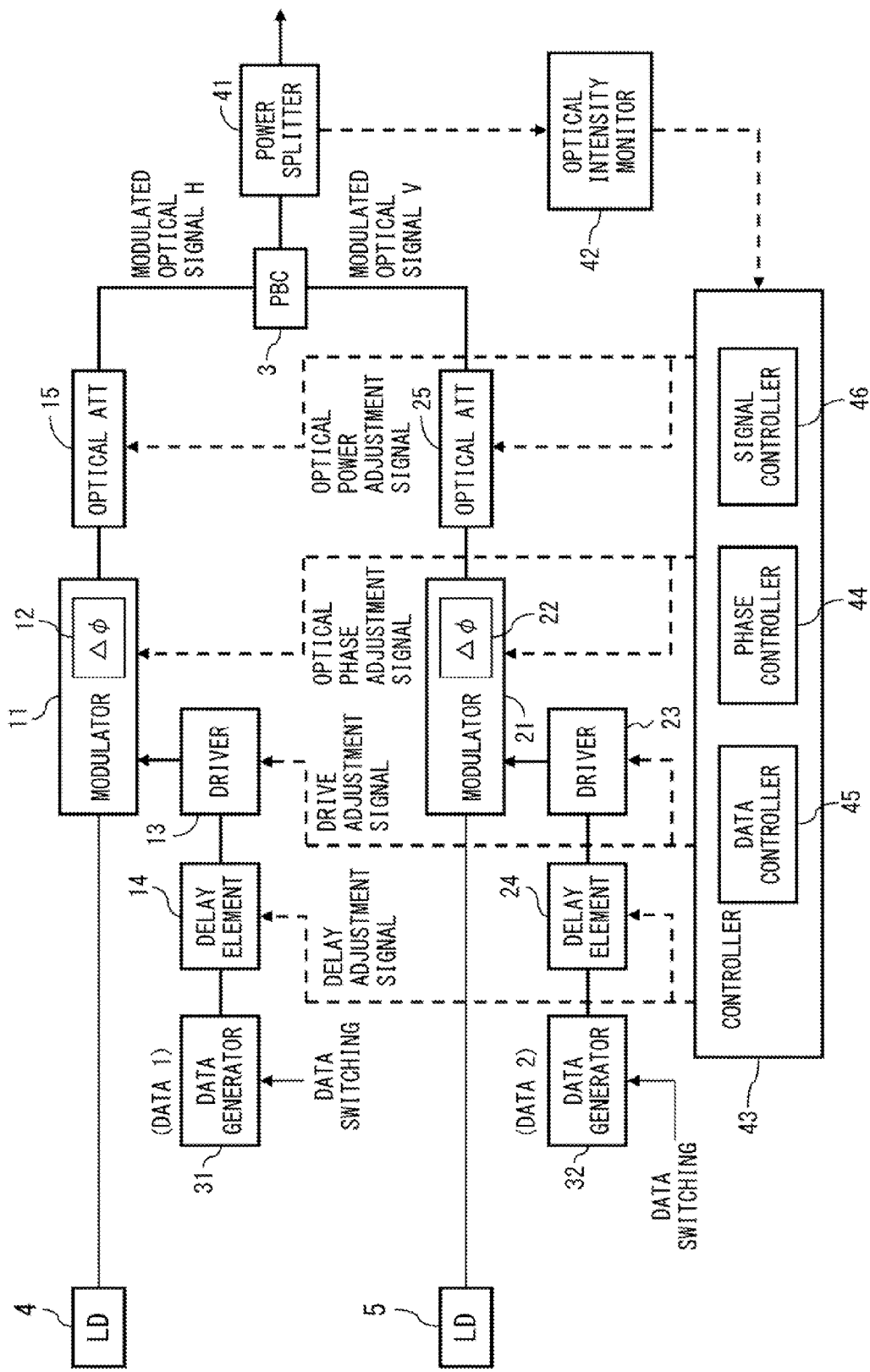
FIG. 24 is a diagram illustrating the configuration of a polarization multiplexed optical transmitter having two light sources.

In the configuration illustrated in FIG. 2, the CW light generated by the light source 1 is split and guided to the modulators 11 and 21. However, the present invention is not limited to this configuration. That is, the polarization multiplexed optical transmitter may be configured to have two light sources 4 and 5, as illustrated in FIG. 24. In this case, the CW lights generated by the light sources 4 and 5 are guided to the modulators 11 and 21, respectively. At this time, the wavelengths of the CW lights generated by the light sources 4 and 5 may be the same as each other or may be different from each other. However, when the wavelengths are different from each other, it is preferable that these wavelengths are selected within a wavelength range in which the wavelength dependence of the photo detector of the optical intensity monitor 42 is small enough to be regarded as negligible.

Meanwhile, in the configuration in which a light source is provided respectively for each modulator, the output power of the light sources may be controlled while the optical power difference is adjusted. That is, for example, when the optical power of the H polarization signal is higher than that of the V polarization signal, the controller 43 may perform control to reduce the output power of the light source 4 and/or to increase the output power of the light source 5.

Figure 25:
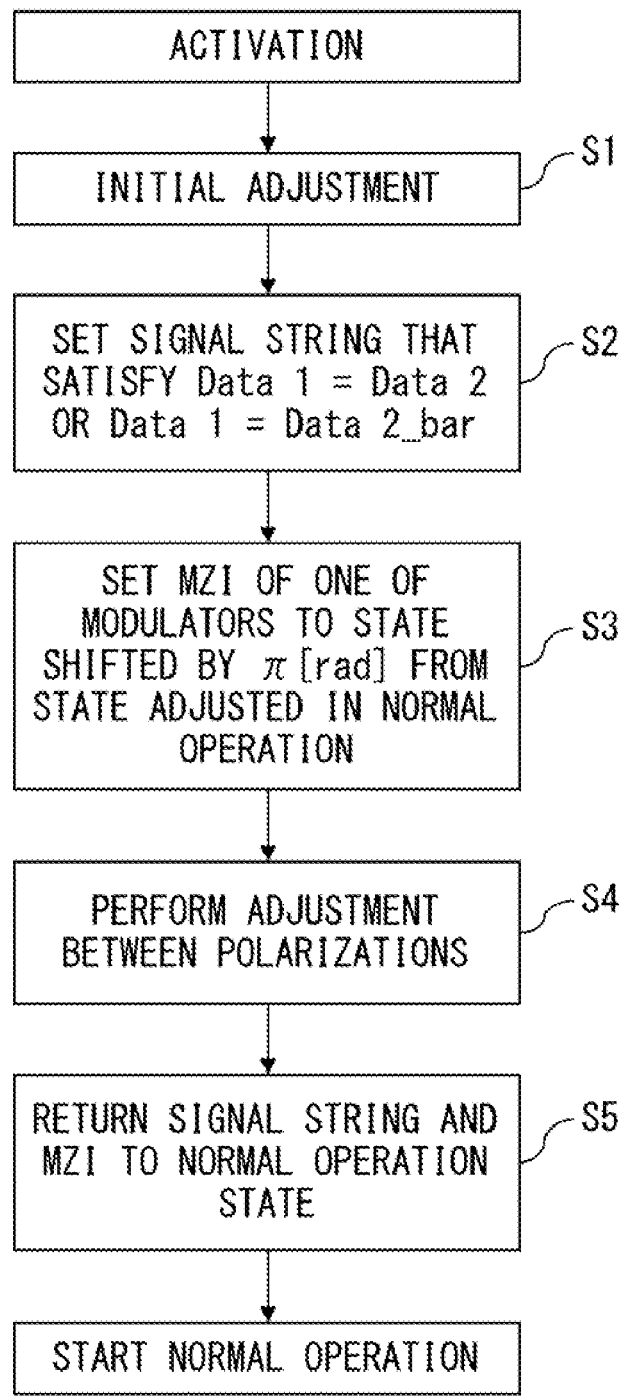
FIG. 25 is a flowchart illustrating a method for adjusting the polarization multiplex optical transmitter according to the embodiment.

Next, the method for adjusting the polarization multiplexed optical transmitter is described. FIG. 25 is a flowchart illustrating the method for adjusting the polarization multiplexed optical transmitter. The process in the flowchart is performed by the controller 43. In addition, the process in this flowchart is performed, for example, before the polarization multiplexed optical transmitter starts data transmission, or at maintenance times.

In step S1, initial adjustment is performed. In the initial adjustment, for example, the output power of the light source 1 (or, the light sources 4 and 5), the DC bias of the modulators 11 and 21, the attenuation amount of the optical attenuators 15 and 25 are respectively set to a target value. In addition, in a case in which the modulators 11 and 21 performs QPSK (including DQPSK) modulation, phase difference $\pi/2$ is given between the optical paths P1 and P2 illustrated in FIG. 17A and FIG. 17B.

In step S2, the controller 43 makes the data generators 31 and 32 generate control data (data 1 and data 2) that satisfy the following condition.

"data 1=data 2" or "data 1=reversed data 2"

That is, the same data are input to the modulators 11 and 21. Alternatively, reverse data to each other may be input to the modulators 11 and 21. Note that "Data 2_bar" in FIG. 25 indicates reversed data of data 2.

In step S3, in one of the modulators 11 and 21, the phase difference between the optical paths of the Mach-Zehnder interferometer is shifted by $\pi$ from the target value. Here, in the case in which the modulators 11 and 21 perform BPSK modulation, for example, the modulator 11 is controlled to the state illustrated in FIG. 3A, and the modulator 21 is controlled to the state illustrated in FIG. 3B. Meanwhile, in the case in which the modulators 11 and 21 perform QPSK modulation, for example, the modulator 11 is controlled to the state illustrated in FIG. 17A, and the modulator 21 is controlled to the state illustrated in FIG. 17B.

In step S4, the optical intensity waveform of the polarization multiplexed optical signal is monitored, and feedback control to match the characteristics of the H polarization signal and the V polarization signal is performed. When minimizing the timing error between the polarization signals, for example, the delay time of the delay elements 14 and/or 24 is controlled by the delay adjustment signal. When minimizing the Tr/Tf difference between the polarizations, for example, the drive current of the drivers 13 and/or 23 is adjusted by a drive adjustment signal. When minimizing the optical power difference between the polarizations, for example, the attenuation amount of the optical attenuators 15 and/or 25 is controlled by an optical power adjustment signal.

In step S5, the controller 43 makes the data generators 31 and 32 generate transmission data. In addition, the controller 43 controls the phase difference between the optical paths of the Mach-Zehnder interferometer provided in the modulators 11 and 21 to the target value. Data transmission starts after that.

Figure 26:
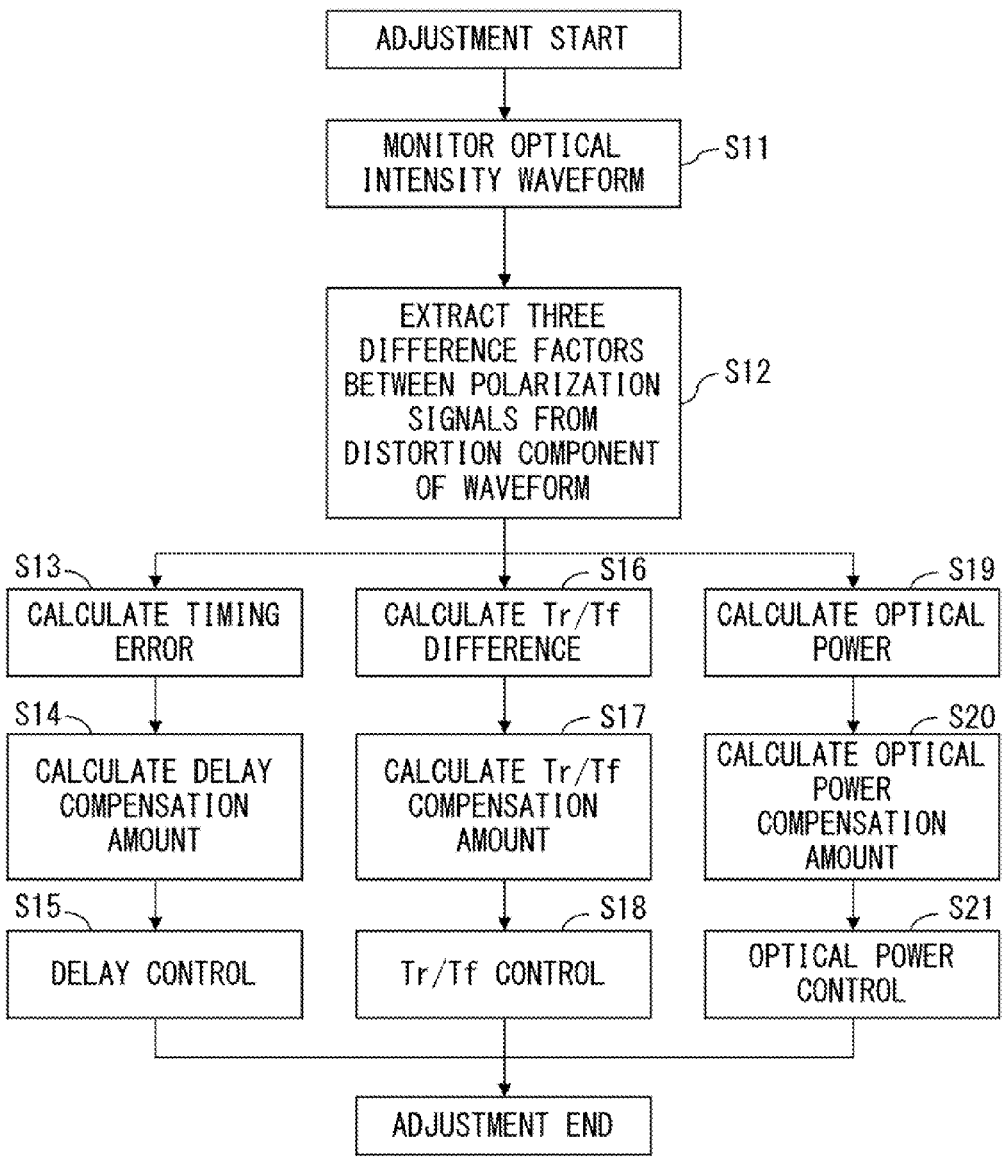
FIG. 26 is a flowchart illustrating a method for adjusting the balance between polarizations.

FIG. 26 is a flowchart illustrating the method for adjusting the balance between the polarizations of the polarization multiplexed optical signal. The process in the flowchart corresponds to S4 in FIG. 25.

In step S11, the controller 43 monitors the optical intensity waveform of the polarization multiplexed optical signal. The signal representing the optical intensity of the polarization multiplexed optical signal is obtained by the optical intensity monitor 42. In step S12, functions for the three distortion factors described above (the timing error, the Tr/Tf difference, the optical power difference) are extracted from the distortion component of the optical intensity waveform of the polarization multiplexed optical signal. The method for extracting functions for the respective distortion factors is as described above. Note that "function" includes pattern of pulse(s) of the optical intensity waveform. The "pattern of pulse (s)" includes the number of pulses, amplitude and/or width of the pulse, sign (positive or negative) of the pulse, occurrence order of the pulses, and so on.

In steps S13-S15, the timing error between polarizations is minimized. That is, in Step S13, the timing error between the H polarization signal and the V polarization signal (or, the delay time difference between the polarizations) is calculated based on the function for the timing error extracted in step S12. In step S14, the delay compensation amount corresponding to the timing error is calculated. Here, for example, in the case in which the delay time of the delay elements 14 and 24 is controlled by the voltage, as the delay compensation amount, the voltage corresponding to the timing error is calculated. In this case, it is assumed that the correspondence relationship between the timing error and the voltage has been obtained in advance. Then, in step S15, the delay time of the delay elements 14 and/or 24 is adjusted according to the calculated delay compensation amount.

In steps S16-S18, the Tr/Tf difference between the polarizations is minimized. That is, in step S16, the Tr/Tf difference between the polarizations is calculated based on the function for the Tr/Tf difference extracted in step S12. In step S17, the Tr/Tf compensation amount corresponding to the Tr/Tf difference is calculated. For example, in the case in which the response time of the drivers 13 and 23 is controlled by the drive current, as the Tr/Tf compensation amount, the drive current corresponding to the Tr/Tf difference is calculated. In this case, it is assumed that the correspondence relationship between the Tr/Tf difference and the drive current has been obtained in advance. Then, in step S18, the drive current of the drivers 13 and/or 23 is adjusted according to the calculated Tr/Tf compensation amount.

In steps S19-S21, the optical power difference between the polarizations is minimized. That is, in step S19, the optical power difference between the polarizations is calculated based on the function for the optical power difference extracted in step S12. In step S20, the optical power compensation amount corresponding to the optical power difference is calculated. For example, in the case in which the attenuation amount of the optical attenuators 15 and 25 is controlled by the applied voltage, as the optical power compensation amount, the applied voltage corresponding to the optical power difference is calculated. In this case, it is assumed that the correspondence relationship between the optical power difference and the applied voltage has been obtained in advance. Then, in step S21, the attenuation amount of the optical attenuators 15 and/or is adjusted according to the calculated optical power compensation amount.

While the timing error, the Tr/Tf difference, and the optical power difference are calculated and the corresponding elements (the delay element, the driver, the optical attenuator) are adjusted based on them in the flowchart illustrated in FIG. 26, the control method according to the embodiment is not limited to this procedure. That is, the compensation amount for controlling each element does not need to be calculated directly. For example, the polarization (the V polarization signal or the H polarization signal) having higher optical power may be detected from the distortion component of the optical intensity waveform of the polarization multiplexed optical signal, and the attenuation amount of the corresponding optical attenuator may be adjusted by a specified adjustment amount according to the detection result. In this case, so as to make the optical power difference between polarizations smaller than a specified threshold, an operation to adjust the attenuation amount is performed repeatedly by feedback control. A similar method may be applied to the timing error and the Tr/Tf difference.

Next, a polarization multiplexed optical transmitter and a method for controlling the polarization multiplexed optical signal according to another embodiment are described.

In the embodiment described above (the polarization multiplexed optical transmitter illustrated in FIG. 2 or FIG. 24), the adjustment of the balance between the polarizations of the polarization multiplexed optical signal is performed during the period in which data are not transmitted to a receiving station. In contrast, in the embodiment described below, the balance between the polarizations of the polarization multiplexed optical signal may be controlled during data transmission as well.

Figure 27:
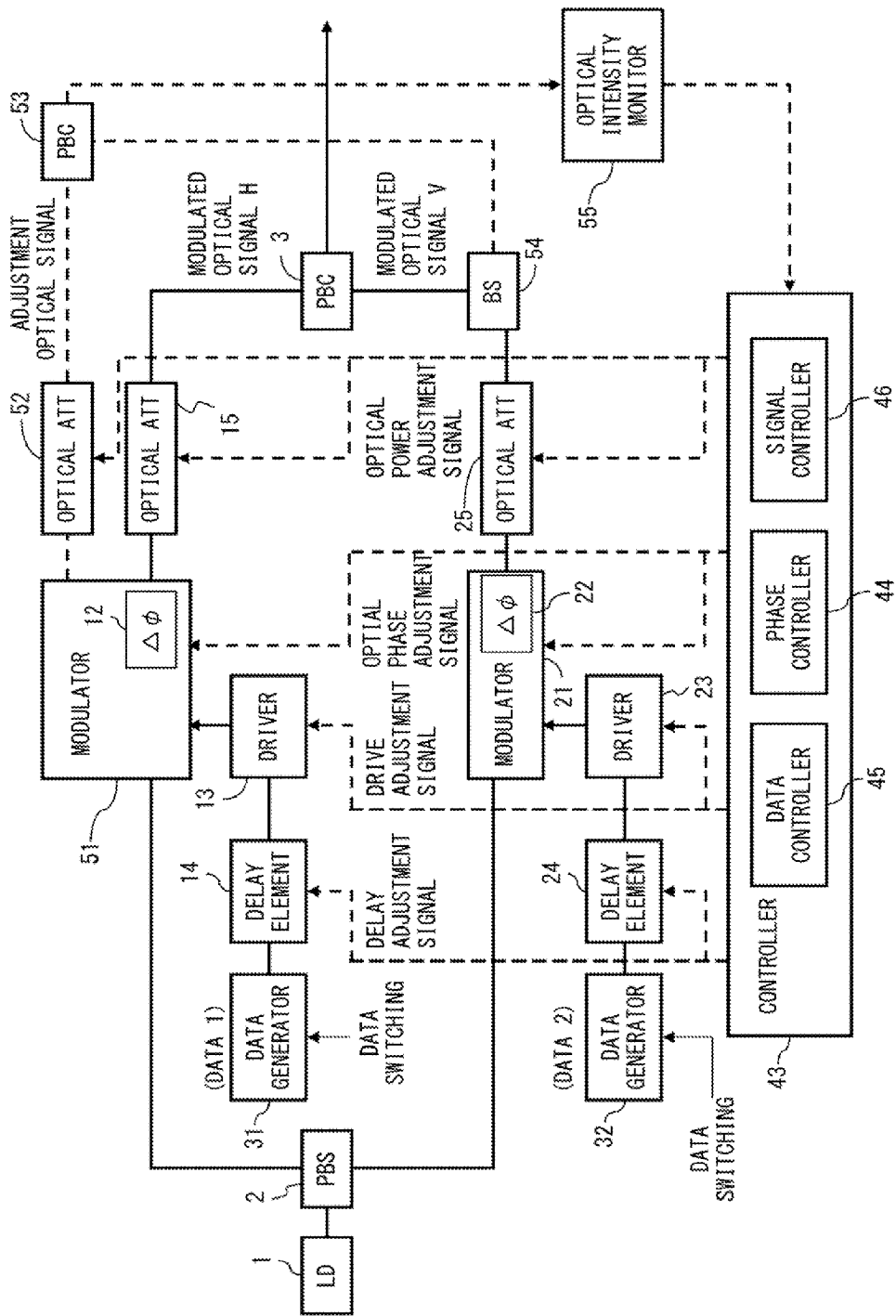
FIG. 27 is a diagram illustrating the configuration of a polarization multiplexed optical transmitter according to another embodiment.

FIG. 27 illustrates the configuration of the polarization multiplexed optical transmitter according to another embodiment. The polarization multiplexed optical transmitter is similar to the configuration illustrated in FIG. 2. However, one of the pair of modulators generates an optical signal for adjustment in addition to the normal optical signal.

A modulator 51 generates a pair of optical signals according to data 1 generated by the data generator 31. One of the optical signals is a modulated optical signal H, which is guided to the polarization beam combiner 3 through the optical attenuator 15. The other of the optical signals is an adjustment optical signal, which is a reversed phase signal of the modulated optical signal H. This adjustment optical signal is guided to the polarization beam combiner 53 through the optical attenuator 52.

The modulator 21 generates an optical signal according to data 2 generated by the data generator 32 in the same manner as in the configuration illustrated in FIG. 2. This optical signal is a modulated optical signal V, which is guided to the beam splitter 54 through the optical attenuator 25. The beam splitter 54 splits the modulated optical signal V and guides it to the polarization beam combiners 3 and 53.

The polarization beam combiner 3 generates a polarization multiplexed optical signal that carries the data 1 and the data 2 by combining the modulated optical signal H generated by the modulator 51 and the modulated optical signal V generated by the modulator 21. This polarization multiplexed optical signal is transmitted to a receiving station through an optical fiber transmission path. The polarization beam combiner 53 generates an adjustment polarization multiplexed optical signal by combining the adjustment optical signal generated by the modulator 51 and the modulated optical signal V generated by the modulator 21. The adjustment polarization multiplexed optical signal is guided to an optical intensity monitor 55. The optical intensity monitor 55 detects the optical intensity of the adjustment polarization multiplexed optical signal.

The controller 43 controls each element (the delay elements 14 and 24, the drivers 13 and 23, the optical attenuators 15, 25 and 52) based on the optical intensity and the waveform of the adjustment polarization multiplexed optical signal detected by the optical intensity monitor 55.

Figure 28A:
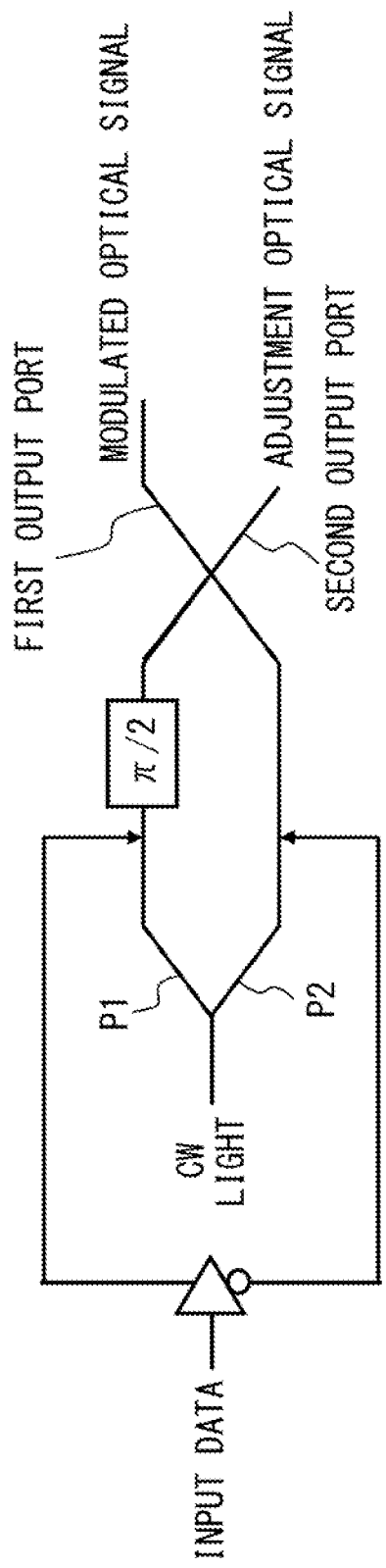
FIG. 28A and FIG. 28B illustrate BPSK modulator used in the configuration illustrated in FIG. 27.

When the modulation scheme is BPSK, the modulator 51 is realized by the configuration illustrated in FIG. 28A for example. In the modulator illustrated in FIG. 28A, the input CW light is split and guided to the optical paths P1 and P2. Phase difference $\pi/2$ is given between the optical paths P1 and P2. In this example, phase adjustment is made so that the optical path lengths of the optical path P1 is longer than the optical path length of the optical path P2 by the amount of $\pi/2$. In addition, the optical paths P1 and P2 are coupled by an X coupler.

In the modulator configured as described above, a pair of optical signals output through a first output port and a second output port of the X coupler are complementary with each other, Therefore, when the modulated optical signal H is output through the first output port of the X coupler, an optical signal with the reversed phase of the modulated optical signal H is output through the second output port of the X coupler. Here, the optical signal output through the second output port of the X coupler is used as the adjustment optical signal illustrated in FIG. 27. That is, the adjustment optical signal is an optical signal with the reversed phase of the modulated optical signal H. Meanwhile, the optical paths P1 and P2 do not have to be coupled by the X coupler. The X coupler may be replaced by another optical coupling element to output a pair of optical signals that are complementary with each other.

Figure 28B:
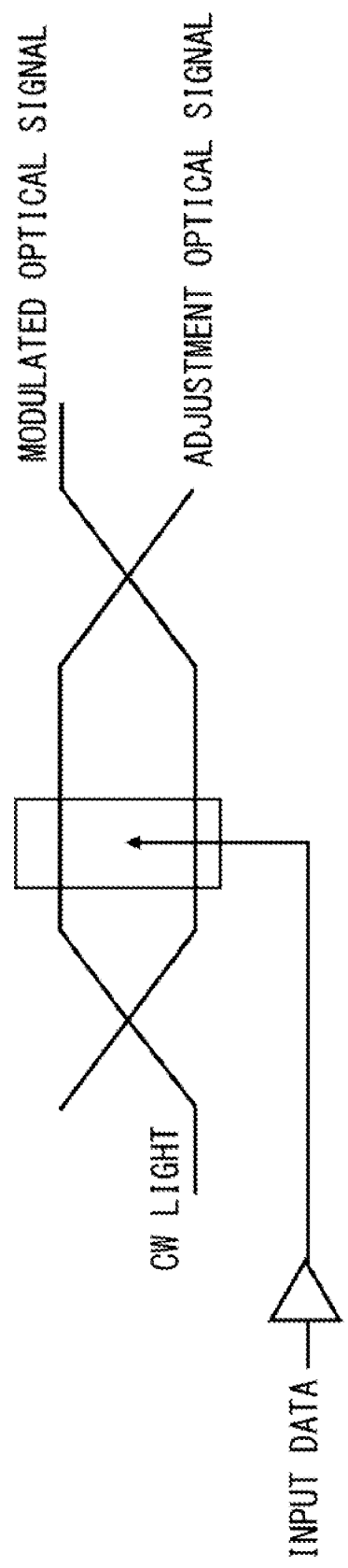

While the modulator illustrated in FIG. 28A is a dual drive configuration, the modulator 51 may be configured to be a single drive configuration as illustrated in FIG. 28B. Also in this configuration, the modulated optical signal H is output from the first output port of the X coupler, and the adjustment optical signal that is a reversed phase signal of the modulated optical signal H is output from the second output port. In the configuration illustrated in FIG. 28B, the input terminal of the Mach-Zehnder interferometer is also configured with an X coupler. In this configuration, the phase difference $\pi/2$ is realized by guiding an optical signal input from one of the ports of the X coupler to the pair of optical paths of the Mach-Zehnder interferometer.

As described above, the modulator 51 generates the modulated optical signal H and the adjustment optical signal. The modulator 21 generates the modulated optical signal V. Here, when the data 1 and 2 that drive the modulators 51 and 21 are the same with each other, the modulated optical signals H and V are the same with each other. In addition, the adjustment optical signal is a reversed phase signal of the modulated optical signal V. The optical intensity of the adjustment optical signal is the same as that of the modulated optical signals H. Therefore, the modulated optical signal V and the adjustment optical signal correspond to the modulated optical signal H and the modulated optical signal V generated at the time of adjustment in the configuration illustrated in FIG. 2. Accordingly, in the polarization multiplexed optical transmitter illustrated in FIG. 27, the balance between the polarizations may be optimized in the same manner as in the configuration in FIG. 2, by performing feedback control using the adjustment polarization multiplexed optical signal in which the adjustment optical signal output from the modulator 51 and the modulated optical signal V output from the modulator 21 are multiplexed.

Figure 29:
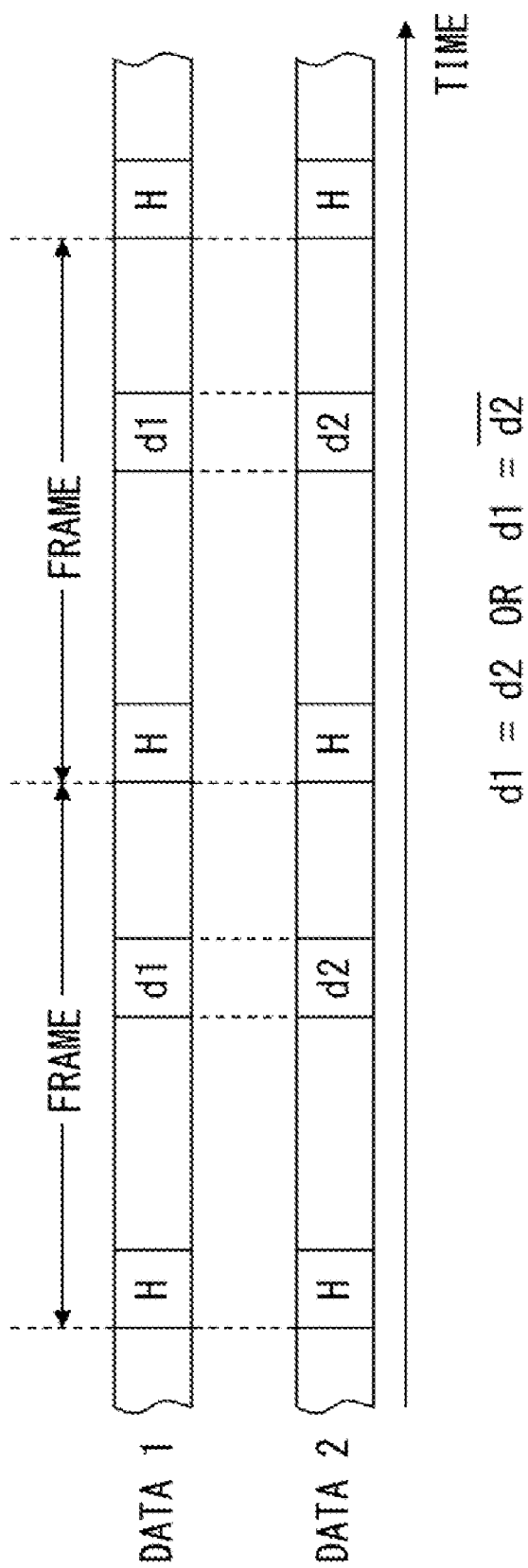
FIG. 29 illustrates data used in the configuration illustrated in FIG. 27.

FIG. 29 illustrates the configuration of data input to the modulators in the polarization multiplexed optical transmitter illustrated in FIG. 27. The data 1 and 2 respectively input to the modulators 51 and 21 are in synchronization with each other. The data 1 and 2 are stored in a frame of a specified length in this example. Each frame has a header H and a body portion. The body portion of each frame for the data 1 stores transmission data and adjustment data d1, and the body portion of each frame for the data 2 stores transmission data and adjustment data d2. The adjustment data d1 and d2 are stored in the same position that has been determined in advance. The data pattern of the adjustment data d1 is the same as the adjustment data d2, or the reversed pattern of the data d2. For example, if the data d1 is "010011", the data d2 is "010011" or "101100".

The adjustment data 1 and 2 are in synchronization with each other as described above. Therefore, the adjustment data d1 and d2 are input to the modulators 51 and 21 regularly and at the same time.

The controller 43 recognizes the timing at which the adjustment data d1 and d2 are generated. Then, the controller 43 monitors the optical intensity of the adjustment polarization multiplexed optical signal output through the polarization beam combiner 53 in the time period in which the adjustment data 1 and 2 are generated. Further, the controller 43 controls the balance between the polarizations of the polarization multiplexed optical signal using the monitoring result. Note that the method for adjusting the delay elements, the drivers and the optical attenuators, etc. for controlling the balance between the polarizations is the same as in the embodiments described above.

The polarization multiplexed optical signal output through the polarization beam combiner 53 s transmitted to a receiving station through an optical fiber transmission path. The receiving station recovers the data 1 and 2 by separating and demodulating the polarization multiplexed optical signal. At this time, the receiving station may remove and discard the adjustment data d1 and d2.

As described above, in the embodiment illustrated in FIG. 27, the balance between the polarizations of the polarization multiplexed optical signal is adjusted while transmitting data to the receiving station. That is, the polarization multiplexed optical transmitter is capable of dynamically controlling the transmission characteristic of the polarization multiplexed optical signal without stopping the data transmission service.

In the embodiment illustrated in FIG. 27, the modulation scheme of the modulators 51 and 21 is not limited to BPSK, and may be another modulation scheme. That is, the modulators 51 and 21 may be, for example, another MPSK (M=2$^n$) such as QPSK.

Figure 30:
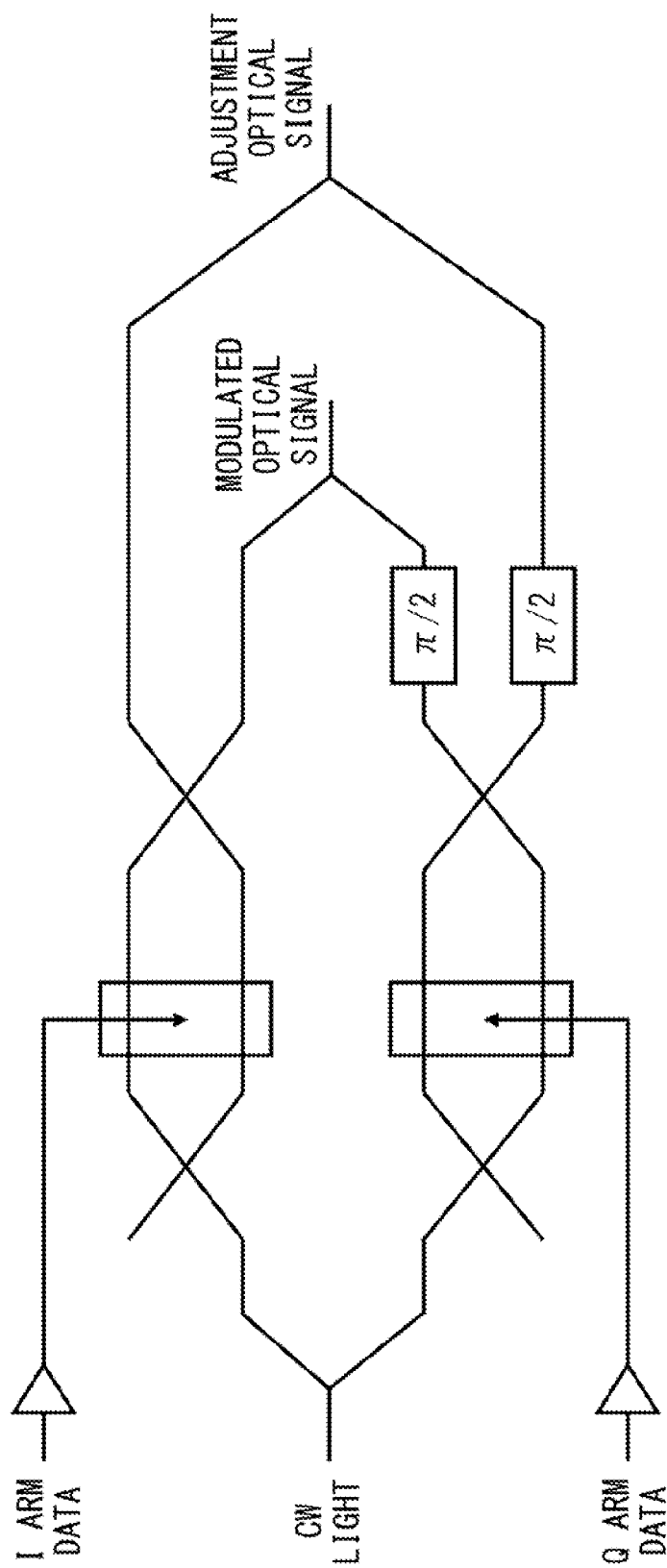
FIG. 30 illustrates a QPSK modulator used in the configuration illustrated in FIG. 27.

FIG. 30 is an example of the modulator 51 that performs QPSK modulation. The modulator 51 that performs QPSK modulation has first and second Mach-Zehnder interferometers, and CW light is input to each Mach-Zehnder interferometer. In addition, I arm data and Q arm data are given to the first and second Mach-Zehnder interferometers, respectively. Each Mach-Zehnder interferometer is a single drive configuration in FIG. 30, however, it may be configured to be a dual drive configuration. In addition, each output port of the second Mach-Zehnder interferometer has a phase shift element for shifting the phase of the optical signal by π/2.

In the modulator configured as described above, an optical signal output from a second output port of the first Mach-Zehnder interferometer and an optical signal output from a first port of the second Mach-Zehnder interferometer are combined and output as a modulated optical signal H that carries transmission data. On the other hand, an optical signal output from a first output port of the first Mach-Zehnder interferometer and an optical signal output from a second output port of the second Mach-Zehnder interferometer are combined and output as the adjustment optical signal. Meanwhile, it is assumed that the adjustment data for (d1 and d2) illustrated in FIG. 29 are inserted into the I arm data and Q arm data at specified intervals, respectively.

Meanwhile, in the embodiment illustrated in FIG. 27, the optical circuit for the adjustment polarization multiplexed optical signal is different from the optical circuit for the main polarization multiplexed optical signal transmitted to the receiving station. For example, a portion of the modulated optical signal V output from the modulator 21 is split by the beam splitter 54. For this reason, the characteristics (for example, the optical path length, the bias value of the modulator/the characteristic of the optical phase operation amount, the optical power, etc.) of the main polarization multiplexed optical signal and the adjustment polarization multiplexed optical signal may not match. Therefore, in the configuration illustrated in FIG. 27, it is preferable that a function to compensate for the difference in these characteristics is provided.

As described above, according to the embodiments illustrated in FIG. 2-FIG. 30, the balance between the polarizations of the polarization multiplexed optical signal is improved or optimized. Therefore, the transmission characteristics of the polarization multiplexed optical signal are improved. As a result, the error rate of the data recovered at the receiving station decreases, and the reception quality improves. Furthermore, when data are recovered by a coherent receiver and a digital signal processor in the receiving station, the load of the digital signal processing is reduced.

Note that there is no particular limitation on the configuration or method of the receiver that receives the polarization multiplexed optical signal generated by the polarization multiplexed optical transmitter according to the embodiments. For example, digital coherent reception may be used, or direct reception using an interferometer maybe used. In addition, the phase π/2 includes π/2+2nπ or −π/2+2nπ (n is an integer).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A polarization multiplexed optical transmitter comprising:
   a first modulation unit to generate a first modulated optical signal by phase modulation and intensity modulation according to first data, the first modulation unit including a Mach-Zehnder interferometer and a first phase shifter to give a phase difference between optical paths of the Mach-Zehnder interferometer;
   a second modulation unit to generate a second modulated optical signal by phase modulation and intensity modulation according to second data, the second modulation unit including a Mach-Zehnder interferometer and a second phase shifter to give a phase difference between optical paths of the Mach-Zehnder interferometer;
   a combiner to generate a polarization multiplexed optical signal by combining the first and second modulated optical signals;
   a phase controller to control phase differences by the first and second phase shifters; and
   a signal controller to control an operation state of at least one of the first and second modulation units, wherein
   the phase controller controls the phase differences by the first and second phase shifters to a specified target value when the first and second data are transmitted, and controls the phase difference by the first phase shifter to the target value and the phase difference by the second phase shifter to a value shifted by an amount of π from the target value during an adjustment operation;
   a data pattern of the first data is same as the second data or reversed pattern of the second data during the adjustment operation; and
   the signal controller controls an operation state of at least one of the first and second modulation units based on an optical intensity waveform of the polarization multiplexed optical signal during the adjustment operation.

2. The polarization multiplexed optical transmitter according to claim 1, wherein
   the signal controller controls an operation state of at least one of the first and second modulation units so that an optical intensity of the polarization multiplexed optical signal is maintained at a constant level.

3. The polarization multiplexed optical transmitter according to claim 1, wherein
   at least one of the first and second modulation units has a delay element to delay a corresponding modulated optical signal; and
   the signal controller extracts a first function component from the optical intensity waveform of the polarization multiplexed optical signal, and controls a delay time of the delay element according to the first function component.

4. The polarization multiplexed optical transmitter according to claim 3, wherein
   the first function represents a pair of a positive pulse and a negative pulse; and
   the signal controller calculates an adjustment amount of the delay element based on an amplitude or a pulse width of the positive pulse or the negative pulse.

5. The polarization multiplexed optical transmitter according to claim 1, wherein
   each of the first and second modulation units has a modulator and a driver to drive the modulator; and
   the signal controller extracts a second function component from the optical intensity waveform of the polarization multiplexed optical signal, and controls a response speed of the driver of at least one of the first and second modulation units according to the second function component.

6. The polarization multiplexed optical transmitter according to claim 5, wherein
   the second function represents a pair of positive pulses or a pair of negative pulses; and the signal controller calculates an adjustment amount of the driver based on an amplitude or a pulse width of the positive pulse or the negative pulse.

7. The polarization multiplexed optical transmitter according to claim 1, wherein
at least one of the first and second modulation units has a power adjustment element to adjust a power of a corresponding modulated optical signal, and
the signal controller extracts a third function component from the optical intensity waveform of the polarization multiplexed optical signal, and controls the power adjustment element according to the third function component.

8. The polarization multiplexed optical transmitter according to claim 7, wherein
the third function represents a positive pulse or a negative pulse; and
the signal controller calculates an adjustment amount of the power adjustment element based on an amplitude of the positive pulse or the negative pulse.

9. A polarization multiplexed optical transmitter comprising:
a first modulation unit to generate a first modulated optical signal by phase modulation and intensity modulation according to first data;
a second modulation unit to generate a second modulated optical signal by phase modulation and intensity modulation according to second data;
a combiner to generate a polarization multiplexed optical signal by combining the first and second modulated optical signals; and
a controller to control an operation state of at least one of the first and second modulation units based on the polarization multiplexed optical signal, wherein
the first modulation unit has a Mach-Zehnder interferometer;
an optical device to output the first modulated optical signal and a reversed signal of the first modulated optical signal is provided at an output terminal of the Mach-Zehnder interferometer;
first and second adjustment data are inserted into the identical position of the first and second data, respectively;
a data pattern of the first adjustment data is same as the second adjustment data or reversed pattern of the second adjustment data; and
the controller controls an operation state of at least one of the first and second modulation units based on an optical intensity waveform of an adjustment polarization multiplexed optical signal in which the reversed signal of the first modulated optical signal and the second modulated optical signal are multiplexed, in a time period in which the first and second adjustment data are inserted.

10. A method for controlling a polarization multiplexed optical signal in a polarization multiplexed optical transmitter comprising a first modulation unit to generate a first modulated optical signal by phase modulation and intensity modulation according to first data, the first modulation unit including a Mach-Zehnder interferometer and a first phase shifter to give a phase difference between optical paths of the Mach-Zehnder interferometer; a second modulation unit to generate a second modulated optical signal by phase modulation and intensity modulation according to second data, the second modulation unit including a Mach-Zehnder interferometer and a second phase shifter to give a phase difference between optical paths of the Mach-Zehnder interferometer; and a combiner to generate a polarization multiplexed optical signal by combining the first and second modulated optical signals, the method comprising:
controlling the phase difference by the first phase shifter to a specified target value and the phase difference by the second phase shifter to a value shifted by an amount of $\pi$ from the target value;
providing first and second control data to the first and second modulation units, respectively, a data pattern of the first control data being same as the second control data or reversed pattern of the second control data; and
controlling an operation state of at least one of the first and second modulation units based on an optical intensity waveform of the polarization multiplexed optical signal generated when the first and second control data are being provided to the first and second modulation units.

11. The method according to claim 10, wherein
at least one of the first and second modulation units has a delay element to delay a corresponding modulated optical signal; and
a delay time of the delay element is controlled so that the optical intensity waveform is symmetry with respect to a time axis.

12. The method according to claim 10, wherein
at least one of the first and second modulation units has a power adjustment element to adjust a power of a corresponding modulated optical signal; and
the power adjustment element is controlled so that an optical intensity of a center part and an optical intensity of a steady level of the optical intensity waveform match each other.

13. The method for controlling according to claim 10, wherein
each of the first and second modulation units has a modulator and a driver to drive the modulator; and
a response speed of the driver of at least one of the first and second modulation units is controlled so that the optical intensity waveform is maintained at a constant level.

* * * * *